(12) United States Patent
Curry et al.

(10) Patent No.: US 8,979,025 B1
(45) Date of Patent: Mar. 17, 2015

(54) COMPACT CARGO LIFT FOR COMMERCIAL AIRCRAFT

(76) Inventors: James M. Curry, Lake Stevens, WA (US); Randolph Schemkes, Snohomish, WA (US)

( * ) Notice: Subject to any disclaimer, the term of this patent is extended or adjusted under 35 U.S.C. 154(b) by 534 days.

(21) Appl. No.: 13/385,557

(22) Filed: Feb. 24, 2012

Related U.S. Application Data

(63) Continuation-in-part of application No. 13/199,696, filed on Sep. 6, 2011, now abandoned, which is a continuation of application No. 11/297,020, filed on Dec. 7, 2005, now Pat. No. 8,011,617.

(60) Provisional application No. 60/691,633, filed on Jun. 17, 2005.

(51) Int. Cl.
*B64C 1/20* (2006.01)

(52) U.S. Cl.
USPC ....................................................... 244/118.1

(58) Field of Classification Search
USPC .................................................... 244/118.1
See application file for complete search history.

(56) References Cited

U.S. PATENT DOCUMENTS

| 3,019,757 | A | | 2/1962 | Bailey |
| 3,028,130 | A | | 4/1962 | Burton |
| 4,287,967 | A | | 9/1981 | Perkins |
| 4,653,707 | A | * | 3/1987 | Hamilton et al. .......... 244/137.2 |
| 5,314,143 | A | | 5/1994 | Luria |
| 5,413,292 | A | | 5/1995 | Luria |
| 6,808,142 | B2 | | 10/2004 | Oki |

FOREIGN PATENT DOCUMENTS

WO        WO 95/23733        9/1995

* cited by examiner

*Primary Examiner* — Tien Dinh
*Assistant Examiner* — Assres H Woldemaryam
(74) *Attorney, Agent, or Firm* — Todd N. Hathaway

(57) ABSTRACT

Apparatus for transferring cargo between upper and lower decks of an aircraft. A lift platform receivable in a through opening in the upper deck is raised and lowered by a mechanism using a cable and linear actuator, such as a ball screw. The entirety of the mechanism may be housed in a structure that forms a divider within the aircraft, such as a horizontal deck, vertical bulkhead, or the lift platform itself, thus saving valuable interior volume of the aircraft. Also provided is a recess formed in the lower deck that receives the lift platform. A translating floor assembly mounted in the recess includes transversely extending deck segments that are displaceable between a raised configuration level with the lower deck, and a lowered configuration that clears the recess to receive the lift platform. Installed tracks guide the deck segments between the raised and lowered configurations.

25 Claims, 36 Drawing Sheets

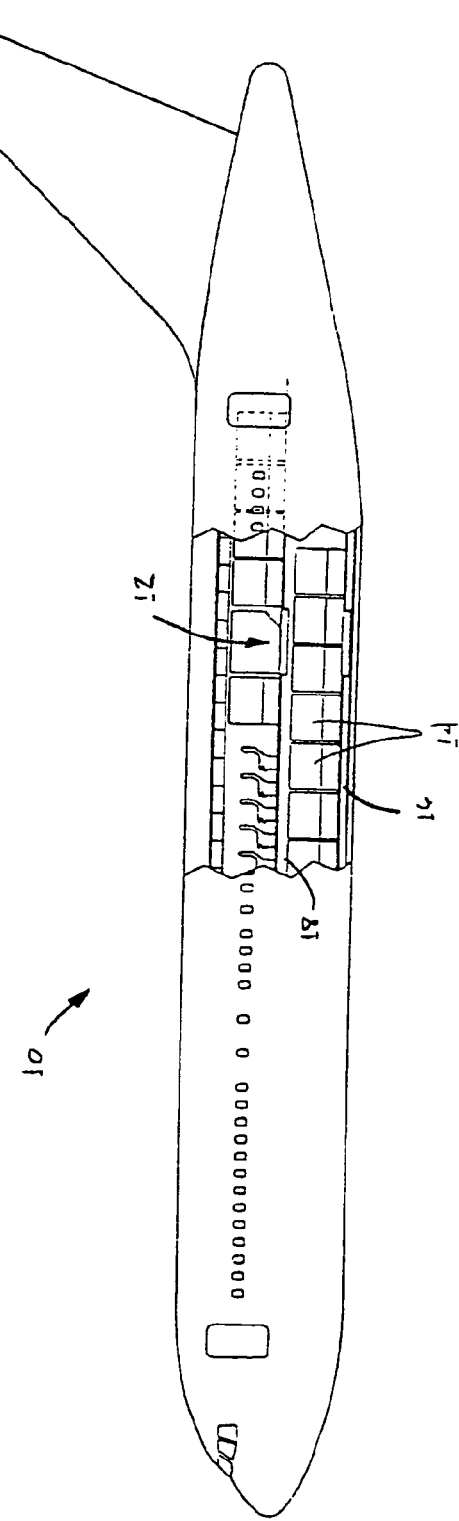

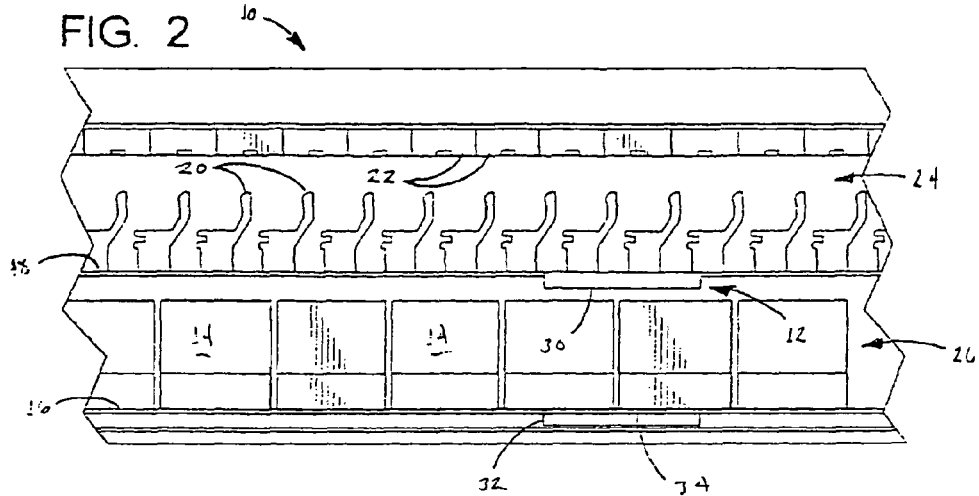
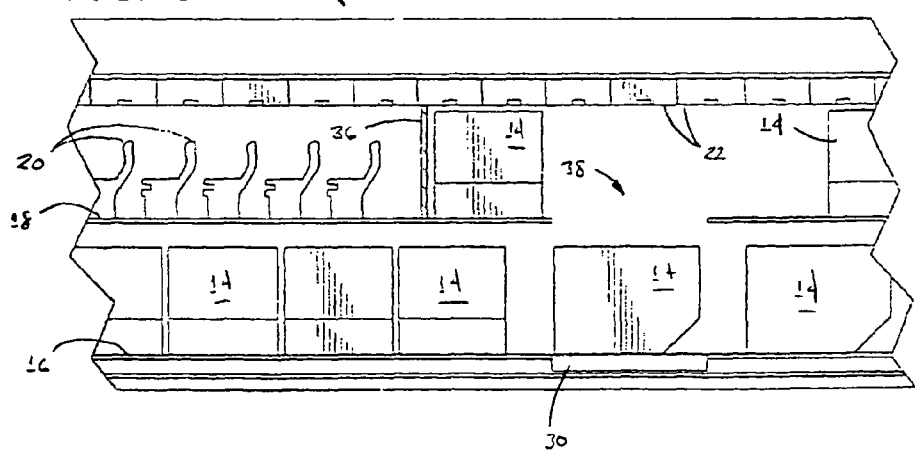

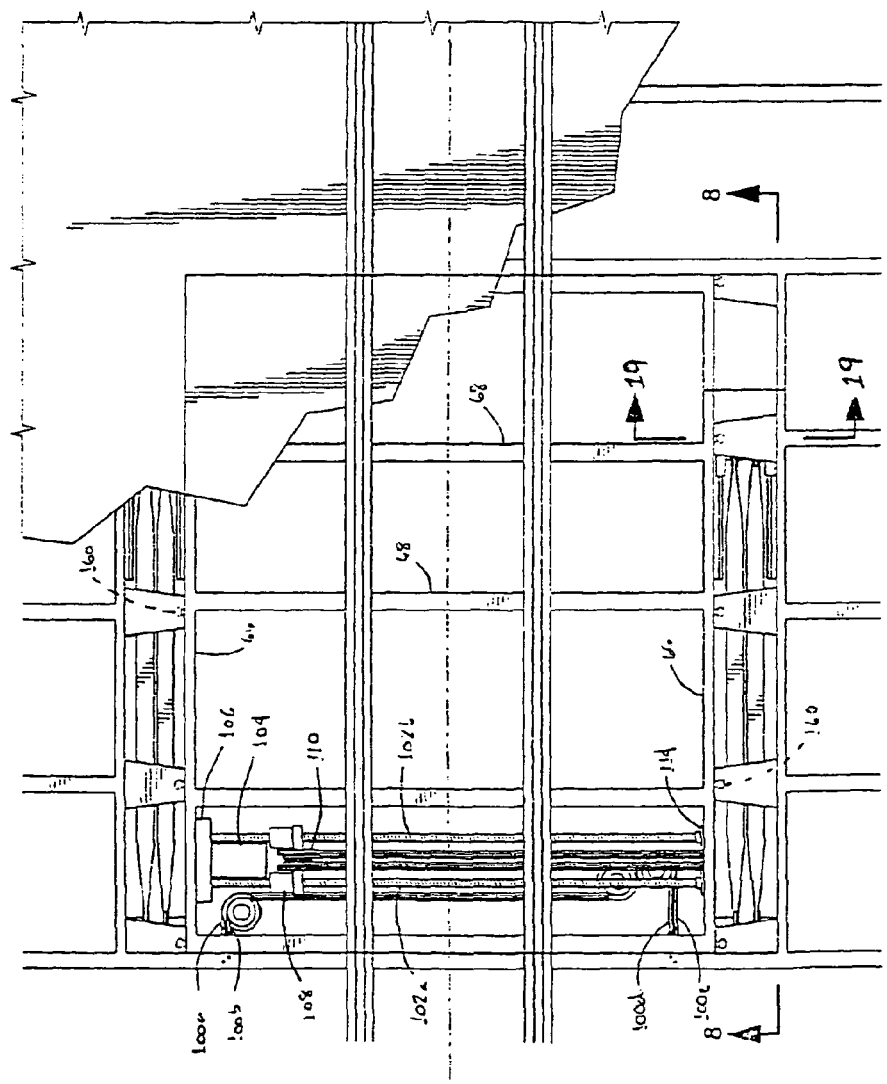

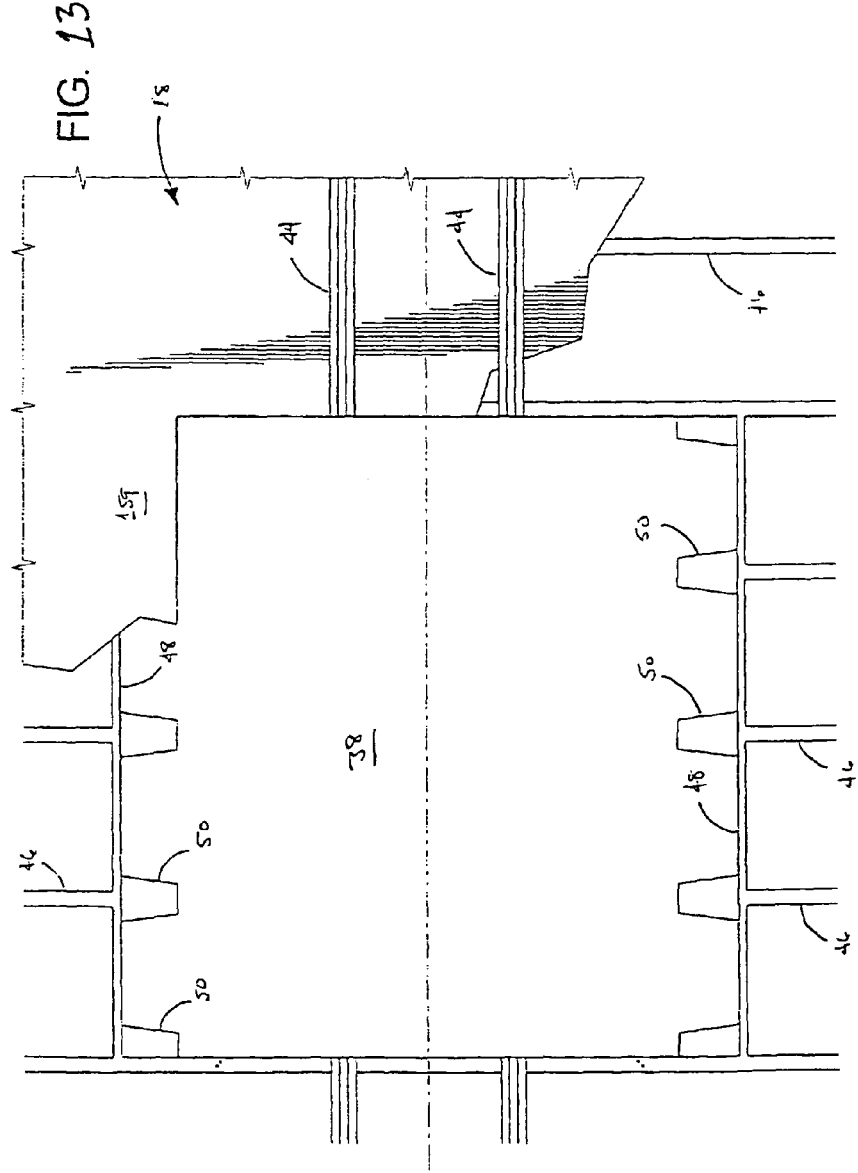

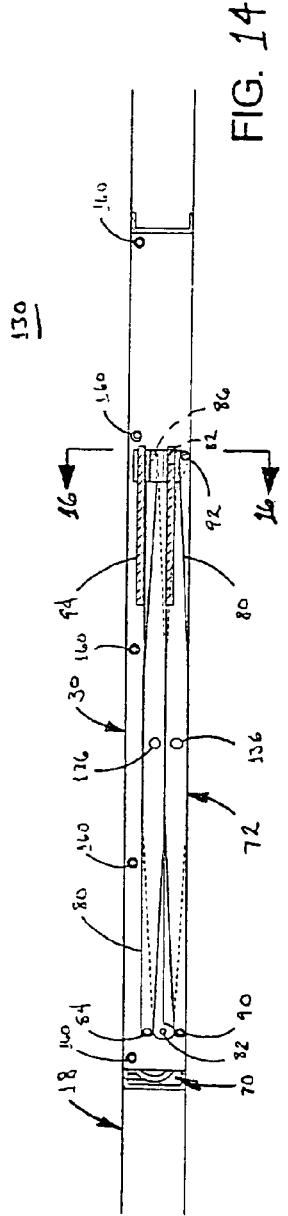

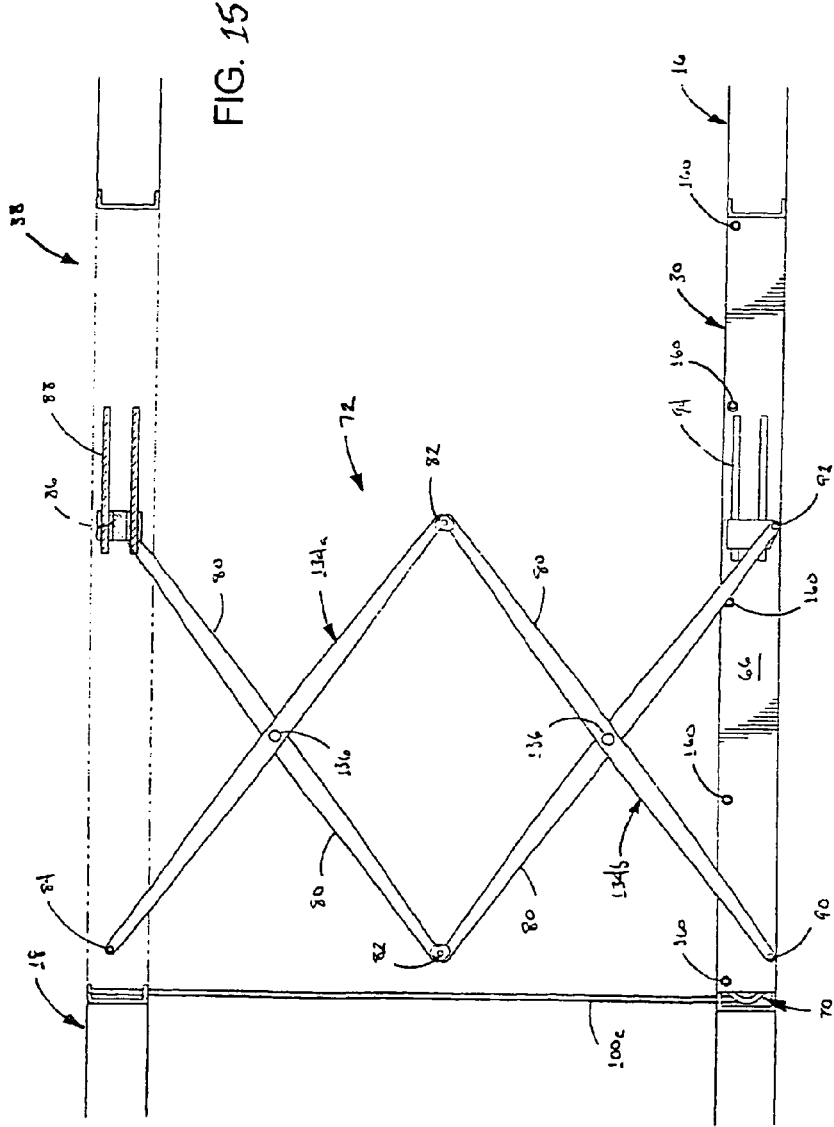

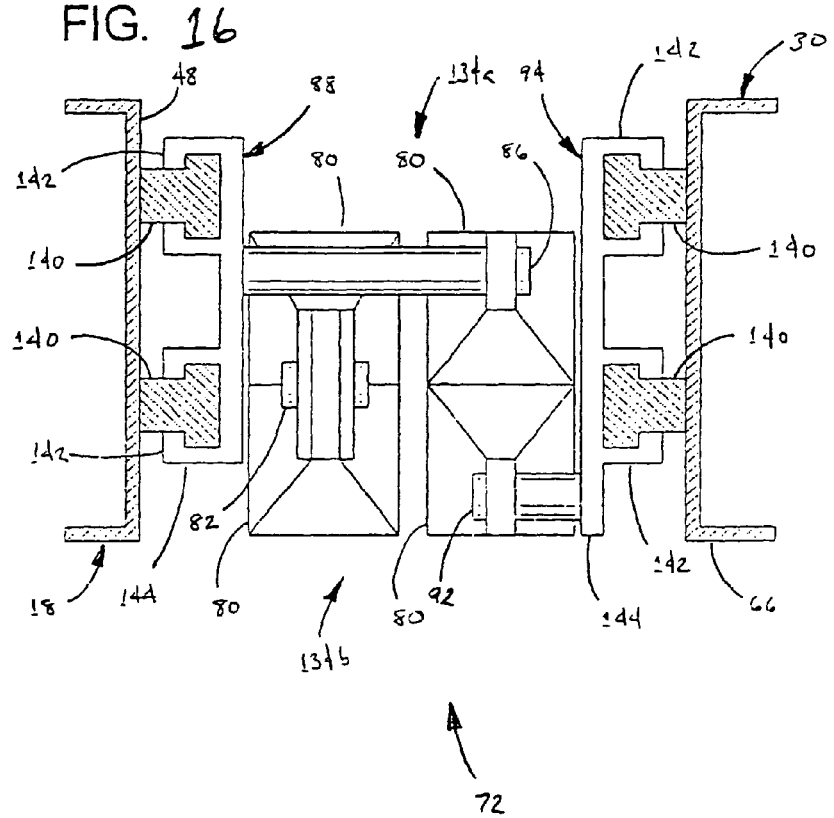

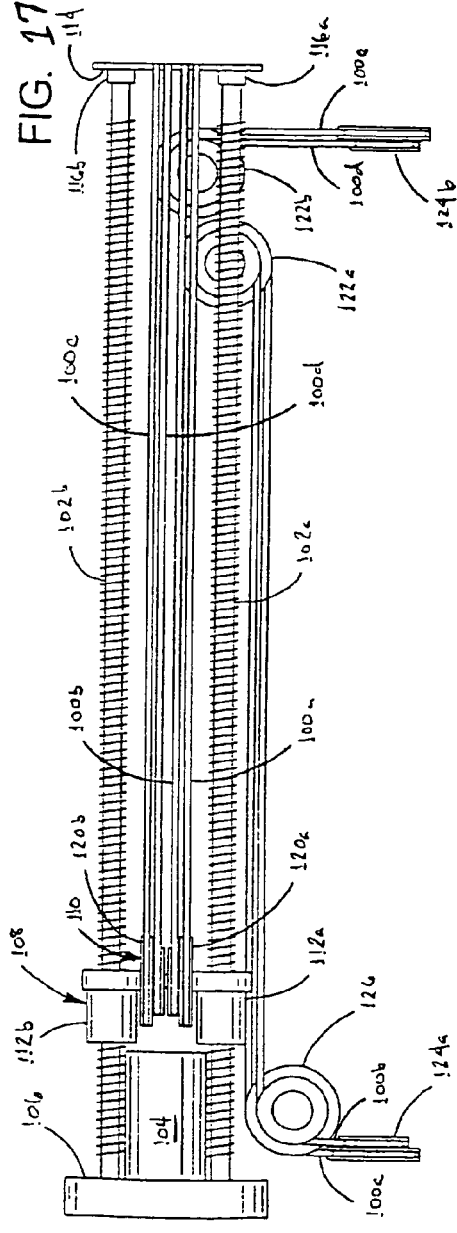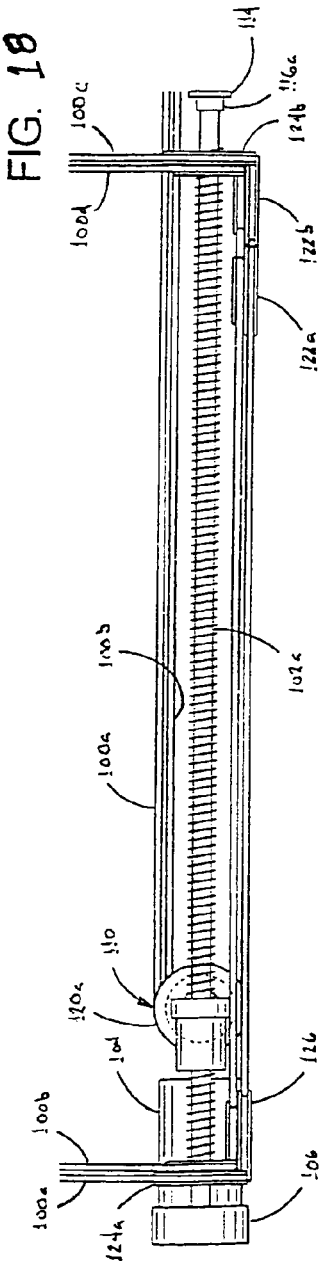

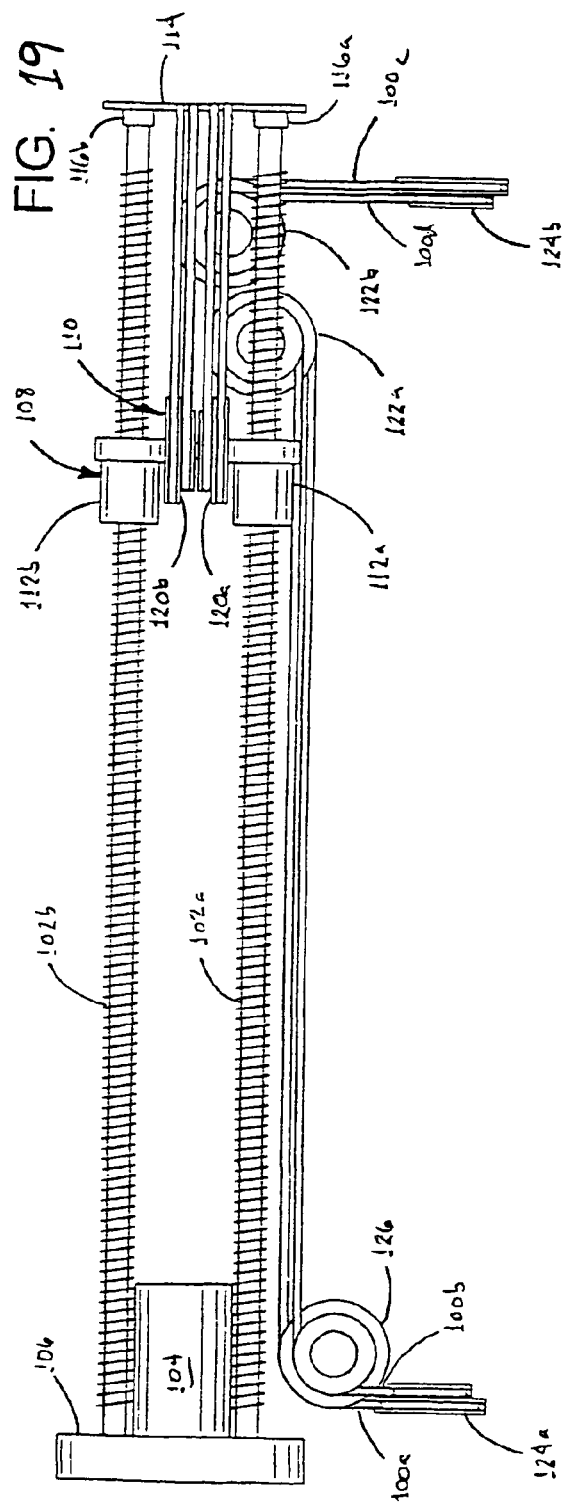

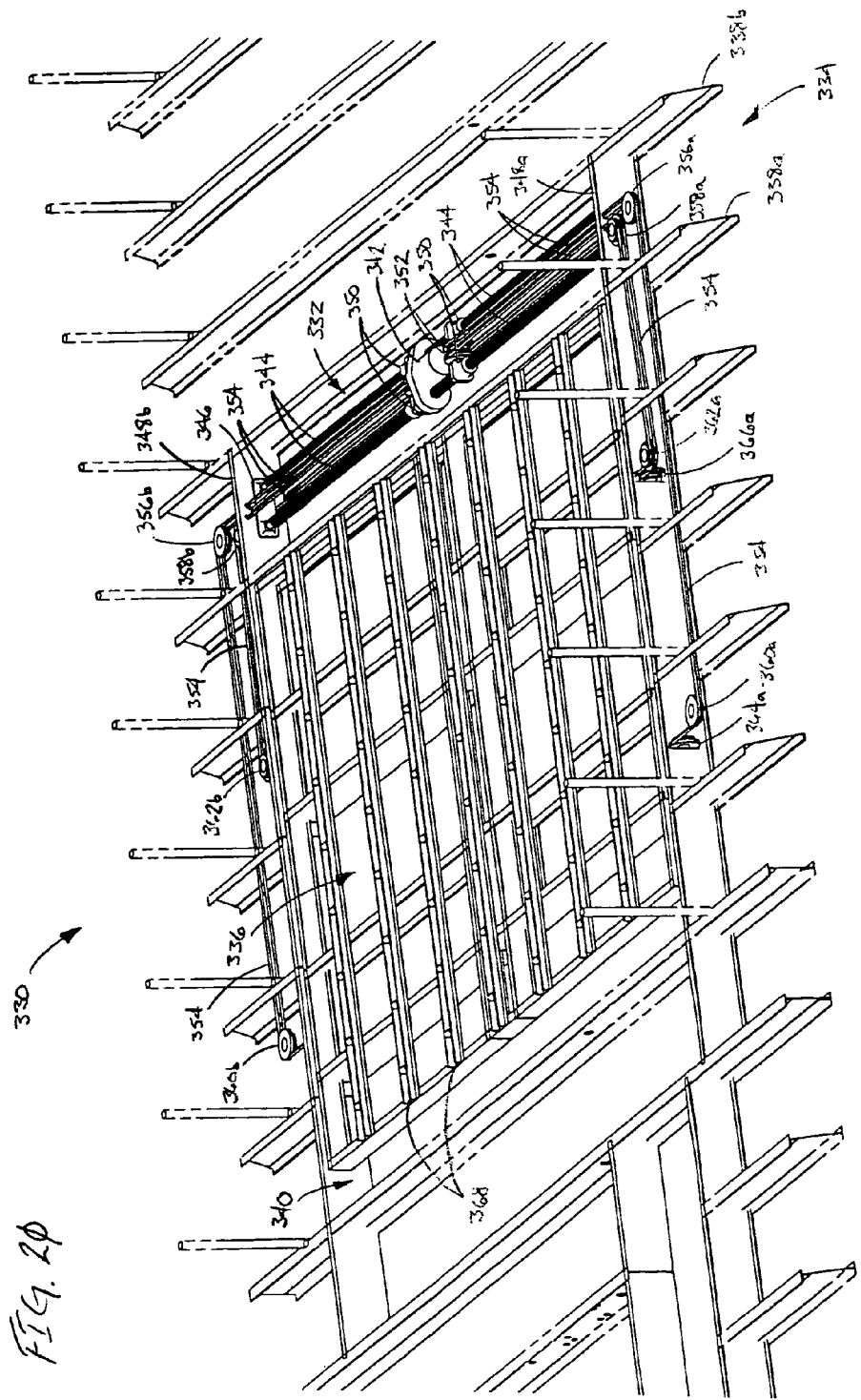

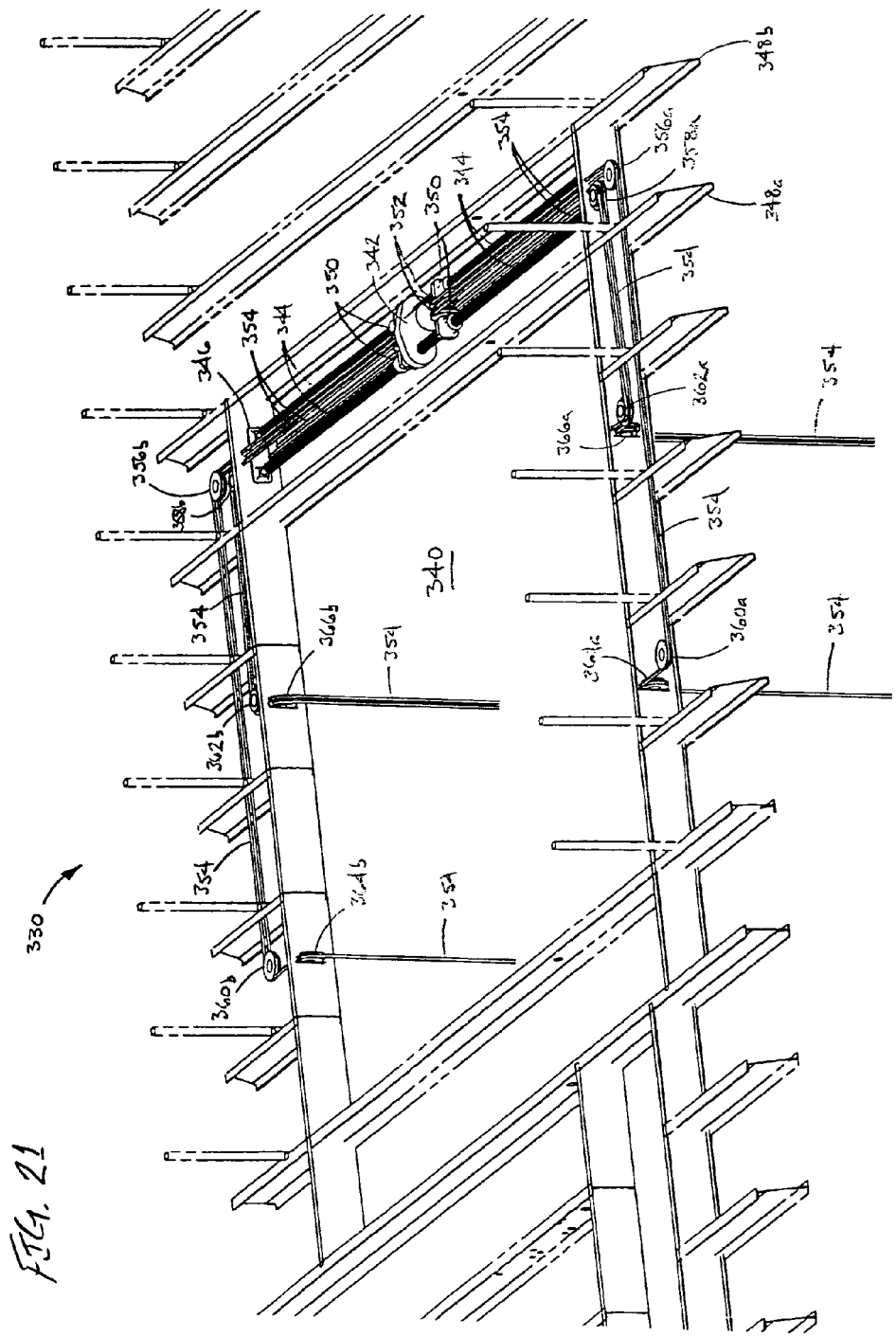

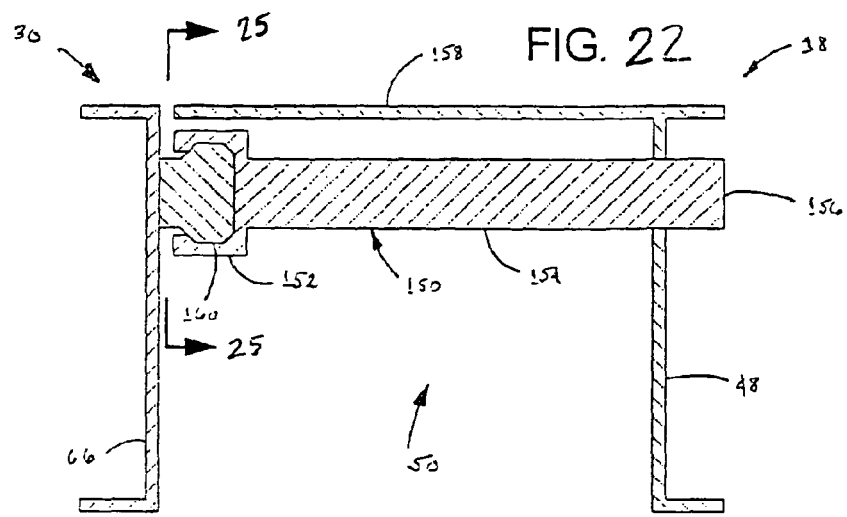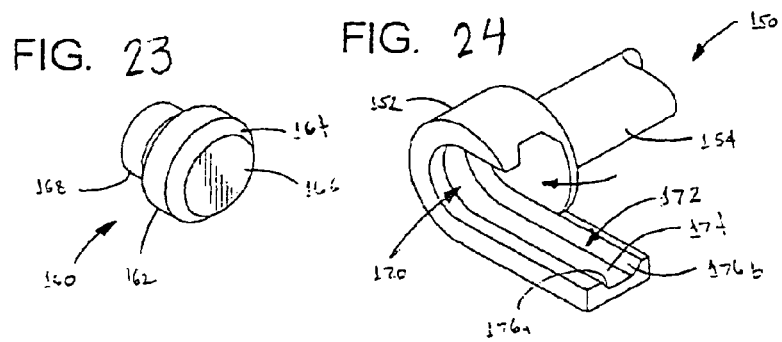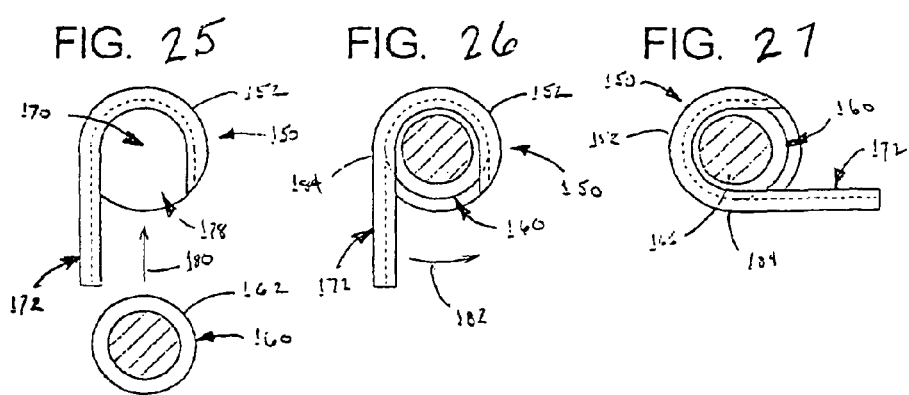

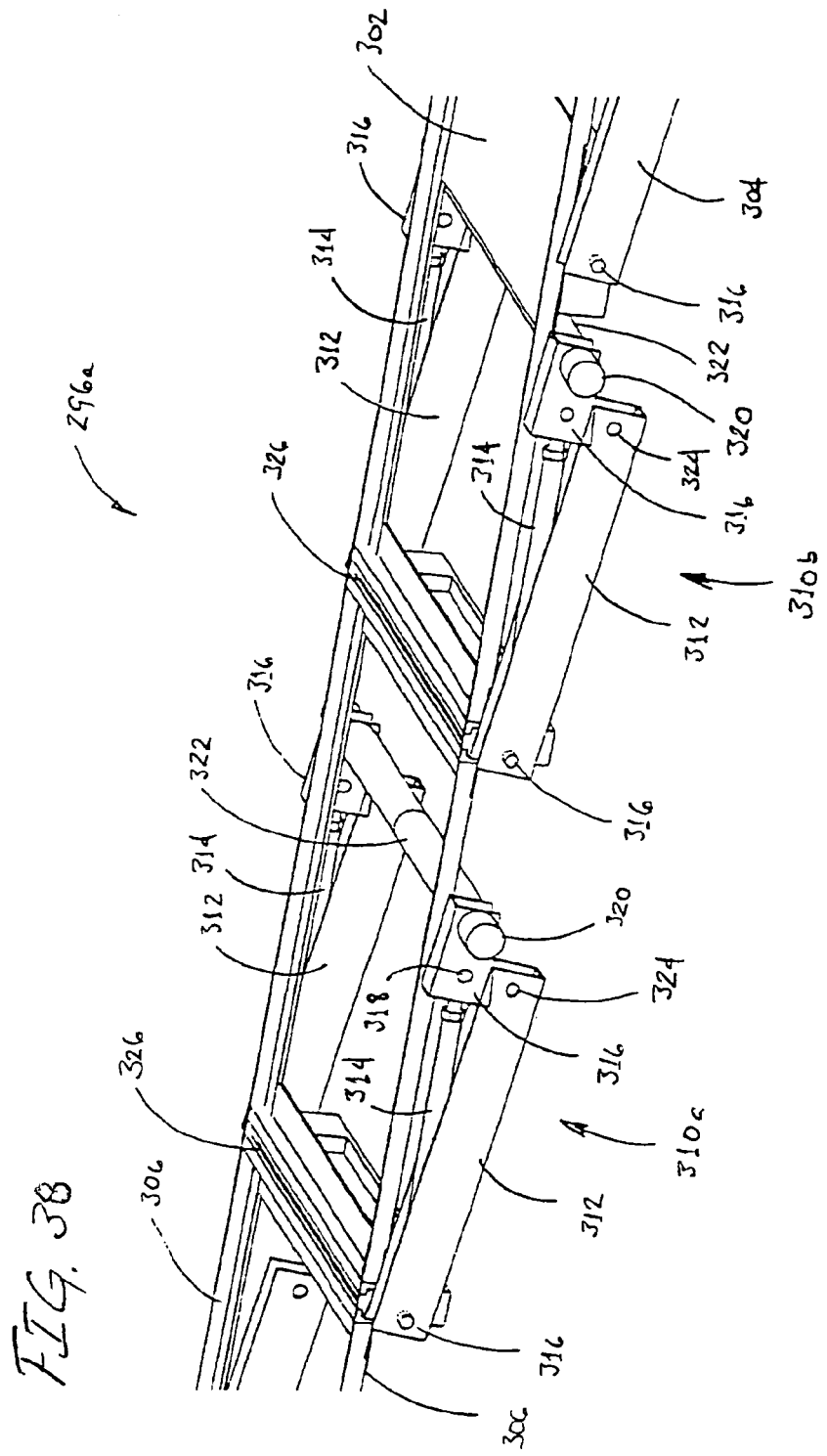

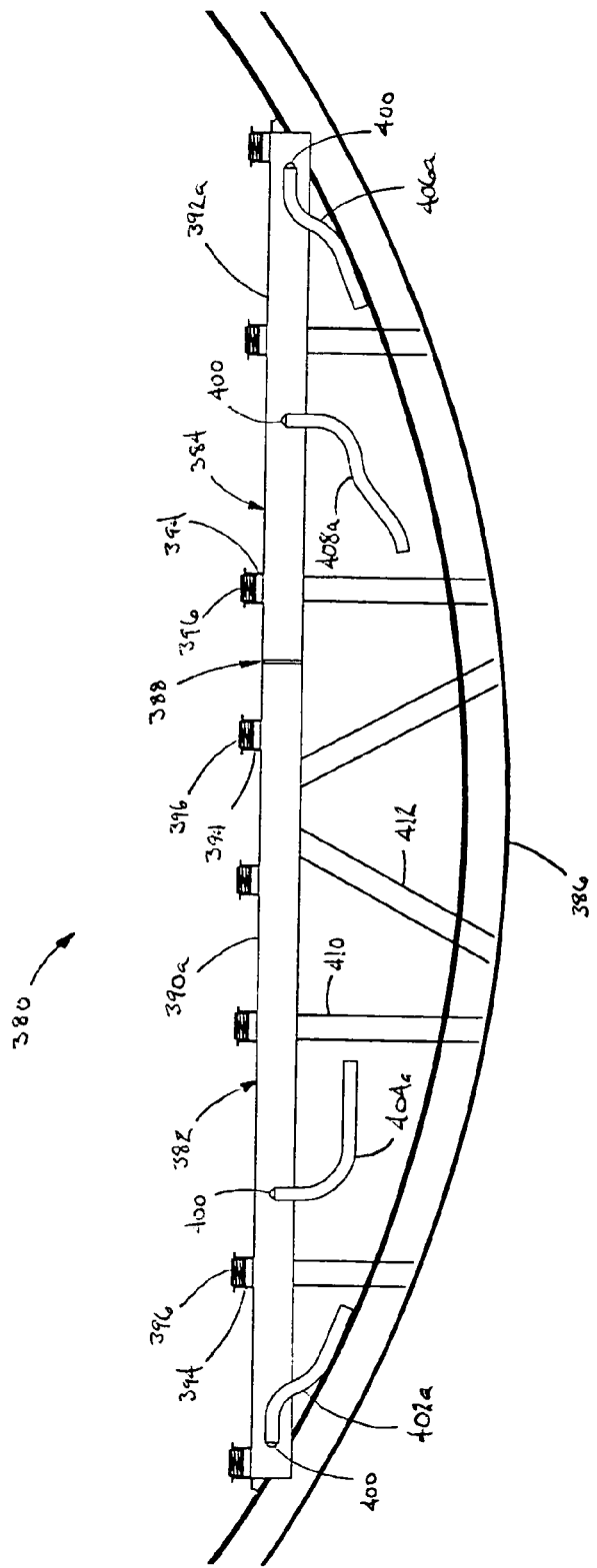

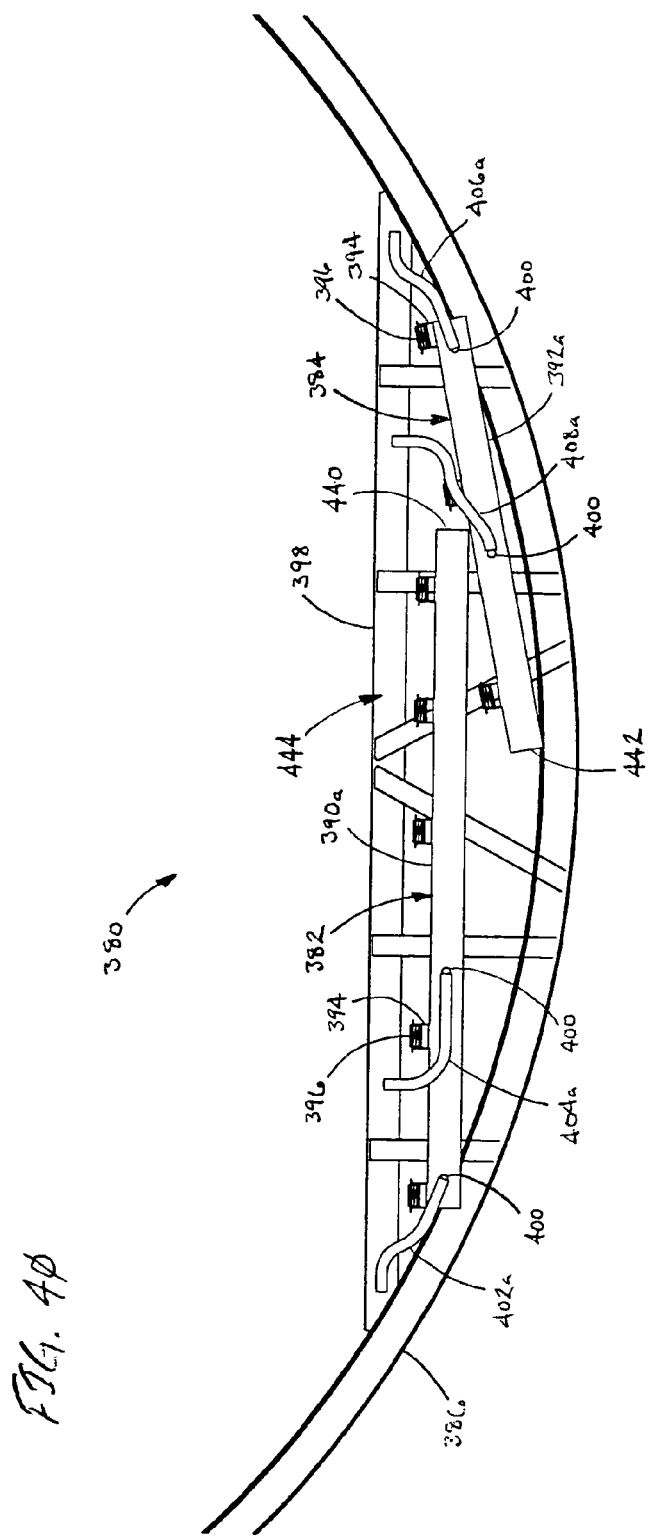

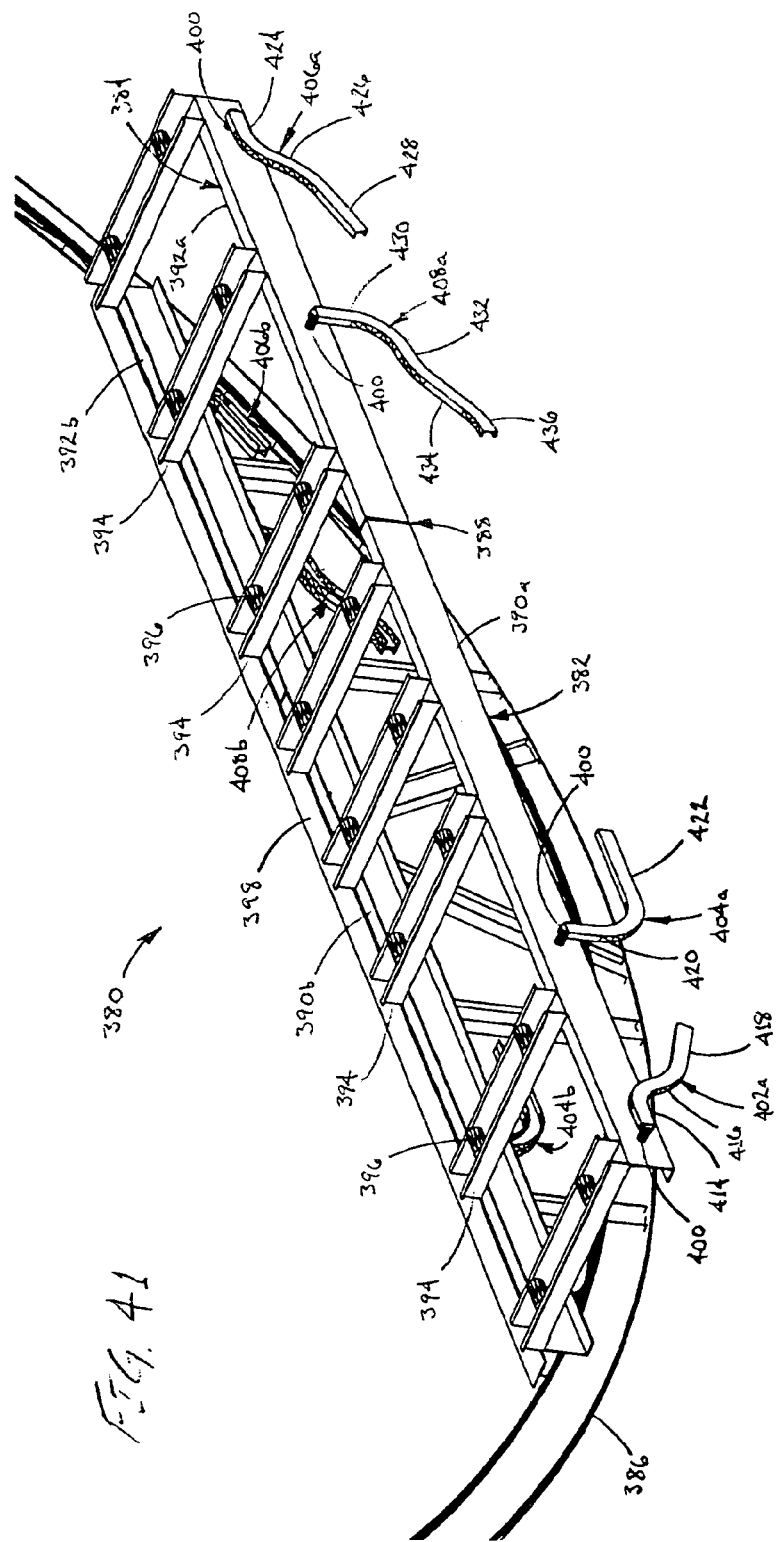

COMPACT CARGO LIFT FOR COMMERCIAL AIRCRAFT

RELATED APPLICATIONS

This application is a continuation-in-part application of U.S. Ser. No. 13/199,696 filed 6 Sep. 2011, now abandoned which is a continuation of U.S. Non-Provisional patent application Ser. No. 11/297,020 filed on 7 Dec. 2005, now U.S. Pat. No. 8,011,617 which claims the benefit of U.S. Provisional Patent Application No. 60/691,633 filed on 17 Jun. 2005.

BACKGROUND a. Field of the Invention

The present invention relates generally to cargo systems for aircraft, and, more particularly, to systems for transferring and stowing cargo within the interior of an aircraft that allows for efficient and cost-effective conversion of passenger aircraft to cargo service.

b. Related Art

Historically, the commercial aircraft industry has distinguished between passenger and cargo aircraft, i.e., certain aircraft are dedicated to passenger travel while others are used solely for transportation of cargo. However, it is frequently desirable to convert an aircraft, in whole or in part, from one service to the other, the most typical example being an older passenger aircraft converted to cargo service.

A problem presented by such conversions is the difficulty in delivering the palletized cargo to the main (passenger) deck of the aircraft, after this area is cleared of seating. In a passenger aircraft, cargo is ordinarily carried in palletized form in lower deck cargo compartments. Typically, there are compartments fore-and-aft of the wing intersection/wheel well area, with each cargo compartment being serviced by a door on the lower lobe. Various types of ULDs (unit load devices) are carried in the compartments; depending on aircraft type and cargo, the ULDs may have a single line or "two abreast" configuration.

In making a cargo conversion, the ability to carry additional ULDs (as opposed to non-containerized cargo) on the main deck is an attractive option, however, it has heretofore been problematic: Carriage of ULDs on the main deck has historically required adding a large cargo door in the upper part of the fuselage, allowing direct access to the main deck; this is a major structural modification, requiring extensive reinforcement, with associated costs and regulatory approval difficulties that impact feasibility.

An alternative would be to transfer cargo from the lower lobe to the main deck (or to the two upper decks in the case of "double decker" jumbo aircraft), since the lower deck already has a cargo door, thus eliminating the requirement for a new main deck door. However, there has heretofore been a lack of satisfactory mechanisms for transferring ULDs from the lower lobe to the passenger deck/decks and vice versa. Moreover, the installation of such a mechanism, when modifying an existing passenger aircraft, presents the potential for structural and cost problems similar to those involved in installing an upper deck cargo door.

Related problems exist in certain dedicated cargo aircraft, notably double-decker "jumbo" aircraft that have been converted to full-time cargo use. For example, 747 cargo aircraft generally transport cargo on the main deck, that in passenger aircraft would carry seating, but the difficulty in raising cargo to the upper deck in the forward position of the fuselage means that this part of the aircraft frequently goes largely unused.

Accordingly, there exists a need for an apparatus for efficiently transferring cargo ULDs and similar containers between the lower area and upper deck or decks of an aircraft, so as to obviate the need to add a large cargo door in the upper part of the fuselage. Furthermore, there exists a need for such an apparatus that does not require major structural modifications of the aircraft. Still further, there exists a need for such an apparatus that, in itself, is comparatively economical, and that is physically compact so as to avoid significantly compromising the availability of space within the passenger and cargo areas of the aircraft. Still further, there exists a need for such an apparatus that is light in weight and does not require power systems that would add significant weight and cost to the aircraft in which the apparatus is installed. Still further, there exists a need for such an apparatus that operates with sufficient rapidity to avoid adding excessive time to loading/unloading operations and turnaround of the aircraft in service.

SUMMARY OF INVENTION

The present invention addresses the problems cited above, and provides an apparatus for transferring cargo between an upper deck and a lower deck of an aircraft.

In a broad aspect, the apparatus comprises (i) a lift platform that is a receivable in a through opening in the upper deck of the aircraft, the lift platform having an upper surface for supporting a load of cargo thereon, and (ii) a lift mechanism for lowering and raising the lift platform between the upper deck and the lower deck so as to transfer loads of cargo to and from the upper deck via the through opening, the lift mechanism comprising at least one lift cable and a drive assembly that selectively extends and retracts the lift cable so as to lower and raise the lift platform, substantially the entirety of the drive assembly being housed in a structure that forms a divider within the aircraft.

The drive assembly may comprise a linear actuator operatively connected to the at least one lift cable so as to be selectively extensible and retractable from and into the lift mechanism. The drive assembly may further comprise an anchor point that retains an end of the at least one lift cable, and a pulley mounted to the linear actuator a spaced distance from the anchor point, the at least one cable being routed over the pulley from the anchor point so that in response to operation of the linear actuator in a first direction that shortens the distance between the pulley and the anchor point the lift cable is extended from the lift mechanism, and in response to operation of the linear actuator in a second direction that increases the distance between the pulley and the anchor point the lift cable is retracted into the lift mechanism. The linear actuator may comprise at least one ball screw having a travelling nut in cooperating drive engagement, the pulley being mounted to the travelling nut, and a motor for reversibly rotating the ball screw, in a first direction that shortens the distance between the pulley and the anchor point so as to extend the lift cable, and in a second direction that increases the distance between the pulley and the anchor point so as to retract the lift cable.

The drive assembly may be mounted so that the linear actuator extends generally parallel to a main plane of the divider that is formed by the structure within the aircraft. The structure in which the drive assembly is housed may comprise the lift platform that is receivable in the opening in the upper deck of the aircraft, a generally horizontal deck of the aircraft, or a generally vertical bulkhead of the aircraft.

The apparatus may further comprise means for stabilizing the lift platform as the lift platform is lowered and raised between the upper and lower decks of the aircraft. The means for stabilizing the lift platform may comprise first and second elongate leg members that are selectively pivotable from a first, horizontal position in which the leg members nest along the lift platform when the lift platform is in a raised and stowed position to a second, vertical position in which the leg members stabilize the lift platform as the lift platform is lowered and raised between the upper and lower decks, and first and second guide members that are mounted to the lift platform in longitudinal sliding engagement with the first and second leg members.

The invention further provides an apparatus for transferring cargo between an upper deck and a lower deck of an aircraft, comprising a lift platform that is receivable in a through opening formed in the upper deck of the aircraft, the lift platform having an upper surface for supporting a load of cargo thereon, and a lift mechanism for lowering and raising the lift platform between the upper deck and the lower deck so as to transfer loads of cargo to and from the upper deck via the through opening, the lift mechanism comprising at least one lift cable and a drive assembly that selectively extends and retracts the lift cable, the drive assembly comprising an anchor point that retains an end of the at least one lift cable, at least one ball screw having a travelling nut in cooperating drive engagement, the travelling nut being located a spaced distance from the anchor point, at least one pulley mounted to the nut, the lift cable being routed over the pulley from the anchor point, and a motor for reversibly rotating the ball screw, in a first direction that shortens the distance between the pulley and the anchor point so as to extend the lift cable, and in a second direction that increases the distance between the pulley and the anchor point so as to retract the lift cable. The drive assembly may be housed substantially entirely within a structure that forms a divider in the aircraft. The structure in which the drive assembly is housed may comprise the lift platform that is receivable in the through opening in the upper deck of the aircraft, a generally horizontal deck of the aircraft, or a generally vertical bulkhead of the aircraft.

The invention further provides an apparatus for transferring cargo between an upper deck and a lower deck of an aircraft, comprising a lift platform that is receivable in a through opening formed in the upper deck of the aircraft, the lift platform having an upper surface for supporting a load of cargo thereon, means for lowering and raising the lift platform between the upper deck and the lower deck so as to transfer loads of cargo to and from the upper deck via the through opening, and a recess in the lower deck of the aircraft for receiving the lift platform therein so that an upper surface of the lift platform extends substantially flush with an upper surface of the lower deck when the lift platform is lowered therein.

The apparatus may further comprise a translating floor assembly mounted in the lower deck of the aircraft, the translating floor assembly having a first position which defines a floor surface that extends over the recess generally flush with the upper surface of the lower deck, and a second position which clears the recess for receiving the lift platform in the lower deck of the aircraft.

The translating floor assembly may comprise at least one collapsible deck section, the collapsible deck section comprising at least one generally transversely extending deck segment, and means for displacing at least one deck segment between a raised configuration in which an upper surface therefore is substantially flush with the upper surface of the lower deck of the aircraft and lowered configuration which the upper surface of the deck segment is depressed below the upper surface of the lower deck so as to clear the recess for receiving the lift platform therein.

The means for displacing the at least one deck segment may comprise at least one guide member mounted to the deck segment, and at least one track member in which the guide member is in cooperating engagement, so that in response to travel of the guide member along the track member the deck segment is guided between the raised and lowered configurations. The at least one guide member may comprise guide rollers mounted to sides of the at least one deck segment, and the at least one track member may comprise guide channels in which the guide rollers are received for travel therethrough.

The at least one collapsible deck section may comprise first and second transversely extending deck segments, and means for displacing of the first and second deck segments between a raised configuration in which the deck segments extend in an end-to-end alignment with upper surfaces thereof substantially flush with the upper surface of the lower deck of the aircraft, and in lowered configuration in which the upper surfaces of the deck segments are depressed below the upper surface of the lower deck so as to clear the recess for receiving the lift platform thereof. The means for displacing the first and second deck segments may comprise at least one guide member mounted to each of the first and second deck segments, and at least first and second track members with which the guide members are in cooperating engagement, so that in response to travel of the guide members along the track members the deck segments are guided between the raised and lowered configurations, the track members extending inwardly and downwardly from relatively elevated outboard ends to relatively depressed inboard ends so as to guide the first and second deck segments inwardly and downwardly towards the depressed configuration and upwardly and outwardly towards the raised configuration.

The collapsible deck section may further comprise a plurality of rail segments mounted on the at least one deck segment that align with cargo rails on the lower deck of the aircraft when the deck segment is in the raised configuration.

The recess in the lower deck of the aircraft may comprise an area of the lower deck of the aircraft in which edges of floor frames have been removed so as to form the recess therein. The translating floor assembly may be mounted in an intercostal space intermediate the floor frames of the lower deck of the aircraft, and the guide channels may be mounted in pairs to the floor frames on opposite sides of the first and second deck segments in the intercostal space between the floor frames.

The translating floor assembly may comprise a plurality of the collapsible deck sections mounted in a plurality of intercostal spaces over a length of the recess in the lower deck of the aircraft.

These and other features and advantages of the present invention will be more fully understood and appreciated from a reading of the following detailed description with reference to the accompanying drawings.

BRIEF DESCRIPTION OF THE DRAWINGS

FIG. 1 is an elevational view of an exemplary aircraft having a cargo lift assembly in accordance with the present invention installed therein, the fuselage thereof being partially cut away so as to show the location of the lift assembly relative to the main cargo and passenger areas of the aircraft;

FIG. 2 is a partial cutaway view of the aircraft of FIG. 1, showing the relationship of the cargo lift assembly to the cargo and main decks of the aircraft when the main deck is used solely for passenger seating;

FIGS. 3-5 are sequential cutaway views, similar to FIG. 2, showing the steps in operating the lift assembly of the present invention to raise/lower cargo ULDs between the lower lobe and the passenger deck of the aircraft;

FIG. 12 is a top, plan view of the cargo lift of FIGS. 1-5, viewed along line 12-12 in FIG. 5, showing the relationship of the drive and support mechanisms of the assembly when in the raised position;

FIG. 13 is a top, plan view of the passenger deck of the aircraft, similar to FIG. 12, with the cargo lift assembly being removed to show the cooperating deck structure in greater detail;

FIG. 14 is a side, cross-sectional view, taken along line 14-14 in FIG. 12, showing the relationship of the scissors-action support components of the cargo lift when in the retracted position;

FIG. 15 is a side, cross-sectional view, similar to FIG. 14, showing the configuration of the scissors-action support mechanism of the lift assembly when in the lowered position;

FIG. 16 is an enlarged, cross-sectional view, taken along line 16-16 in FIG. 14, showing the relationship of the arms of the scissors action support mechanism when the lift assembly is in the retracted position;

FIG. 17 is a top, plan view of the screw-driven pulley mechanism and cables that raise and lower the cargo lift assembly of FIGS. 1-16;

FIG. 18 is a side, elevational view of the screw-driven pulley mechanism of FIG. 17, showing the relationship of the components when in the lowered position;

FIG. 19 is a second top, plan view of the screw-driven pulley mechanism of FIGS. 17-18, showing the relationship of the components when in the raised position;

FIG. 20 is a perspective view of a cargo lift assembly in accordance with another embodiment of the present invention, in which the mechanism for lowering/raising the lift platform is mounted in the aircraft deck adjacent the opening for the platform rather than being housed within the platform itself, showing the lift deck in the raised position;

FIG. 21 is a second perspective view of the lift assembly of FIG. 20, with the lift platform being lowered below the deck having the mechanism housed therein;

FIG. 22 is a side, cross-sectional view, taken along line 22-22 in FIG. 12, showing one of the locking mechanisms which mates the deck of the cargo lift with the main deck of the aircraft when in the raised position;

FIG. 23 is a perspective view of the load-bearing pin of the locking mechanism of FIG. 22, showing the configuration thereof in greater detail;

FIG. 24 is a perspective view of the rotating coupler of the locking mechanism of FIG. 22, showing the configuration thereof in greater detail.

FIG. 25 is an end, elevational view of the load-bearing pin and coupler of FIGS. 23-24, showing the manner in which the pin is received within the coupler in response to the deck being raised to the passenger deck of the aircraft;

FIG. 26 is a second end, elevational view of the load-bearing pin and coupler of FIGS. 23-25, showing the manner in which the coupler is rotated relative to the pin once the latter has been received therein;

FIG. 27 is a third end, elevational view of the load-bearing pin and rotating coupler of FIGS. 23-24, showing the relationship thereof when the coupler has been rotated to the locked position, so as to retain the cargo lift in its raised orientation, level with the main, passenger deck of the aircraft;

FIG. 38 is an enlarged perspective view of the central portion of the folding floor section of FIGS. 37A-B, showing the actuating mechanism thereof in greater detail;

FIG. 39 is a front elevational, cutaway view of a drop down floor assembly in accordance with another embodiment of the present invention, mounted in the cargo deck floor of an aircraft, showing the drop down floor in its raised position with the rail segments supported thereon level with the main rails of the cargo deck floor;

FIG. 40 is a second front elevation, cutaway view of the drop down floor assembly of FIG. 39, showing the assembly in a lowered configuration to form a recess that accommodates the lift platform so that the latter can be lowered level with the cargo deck floor;

FIG. 41 is a front perspective view of the drop down floor assembly of FIGS. 39-40, showing the structure of the floor sections and guide tracks of the assembly in greater detail, with the assembly being in the raised position;

DETAILED DESCRIPTION

Figure 4:
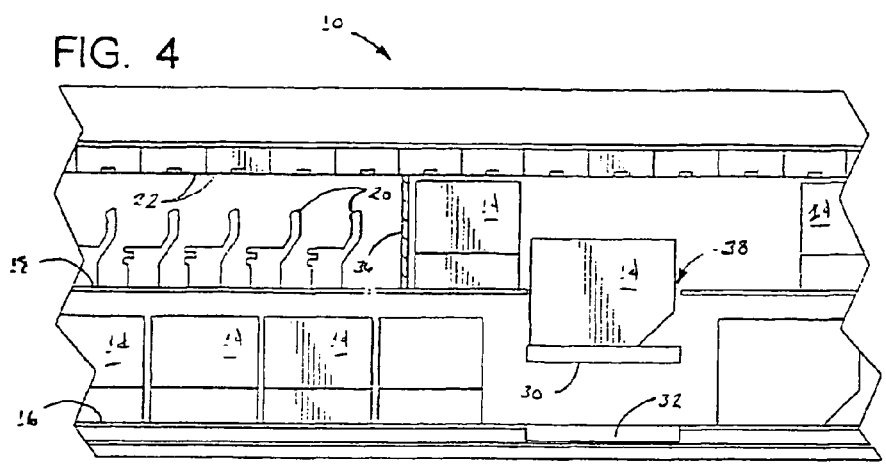

FIG. 1 shows an exemplary wide-body aircraft 10 having a lift assembly 12 installed therein, permitting the aircraft to carry cargo in ULDs 14 on both the cargo and main (passenger) decks 16, 18. As will be explained in greater detail below, the lift assembly is preferable installed in the aft portion of the aircraft, as shown in the figures. FIGS. 2-5, in turn, illustrate the basic operation of the system.

As used in this description and the appended claims, the term "lower deck" refers to a first deck on which cargo is positioned, and the term "upper deck" refers to a second deck above the first, to and/or from which the cargo is transferred by the lift apparatus of the present invention. One may be a dedicated cargo deck and the other primarily a passenger deck, as shown in FIGS. 1-5, or they may both be primarily cargo or passenger decks, particularly in the case of double-decked "jumbo" aircraft (e.g., a Boeing 747 or Airbus A380).

Accordingly, FIG. 2 shows the aircraft in its ordinary, passenger-carrying configuration, with the interior of the upper lobe 24 devoted to seating 20 and overhead storage bins 22, and with carriage of ULDs 14 being confined to the lower lobe 26.

As can be seen, the lift assembly 12 includes a lift platform 30 that is received within an opening in the main deck 18, so that when stowed the lift platform is incorporated into the latter with its upper surface lying generally flush with that of the deck so as to form a more-or-less uninterrupted load surface; as used herein with respect to the lift platform, the term "upper surface" refers to the upper, load-bearing side of the platform, which preferably has a generally flat, horizontal aspect so as to correspond to the surrounding deck of the aircraft, but which may or may not be continuous and may include various projections such as tracks, rollers, tie-downs, housings and so on as well as depressions, openings, and various structural features. As will be described in greater detail below, the mechanism of the lift apparatus allows it to be housed substantially in the lift platform itself to form an essentially self-contained unit, or within the space of the adjoining deck, bulkhead or other partition that divides an interior volume of the aircraft, so that the mechanism is incorporated into the partition to minimize intrusion and the interior volume of the aircraft is not significantly diminished or compromised when the apparatus is installed. Moreover, when in the stowed position, the lift platform preferably attaches structurally to the main deck 18 so as to form a load-bearing component thereof, so that the structural impact to the aircraft (from its unmodified condition) is minimal. As will also be described in greater detail below, a cut-out 32 may be formed in the floor of the cargo deck 16 to receive the platform when it is in the lowered position, and the cutout may be spanned by removable tracks 34 or track segments on drop-down floor structures when the lift platform is stowed in the raised position.

To prepare the upper lobe for cargo use, all or a selected number of seats 20 are removed and a divider panel 36 is installed between the cargo area and any remaining passenger areas of the upper deck. In the lower lobe, in turn, the tracks 34 may be removed so that the lift platform 30 can be lowered to position in which its upper surface is flush with that of the cargo deck 16, as shown in FIG. 3. As the lift platform is lowered, a through opening 38 is vacated in the main deck 18.

The ULDs can thus be loaded/unloaded in the lower lobe through the main loading door (not shown) with which the aircraft was originally equipped. The ULDs/pallets are then moved longitudinally through the hold on tracks (not shown) on deck 16, which again may be an original part of the aircraft. The upper surface of the lift platform 30 may be provided with corresponding track segments that align with those on the cargo deck when the lift is in the lowered position, so that the ULDs 14 can be transported thereover, e.g., to the position of the right-most ULD in FIG. 3. ULDs can also be stopped atop the lift platform in the position shown in FIG. 3, in preparation for being raised to the main passenger deck 18.

Figure 5:
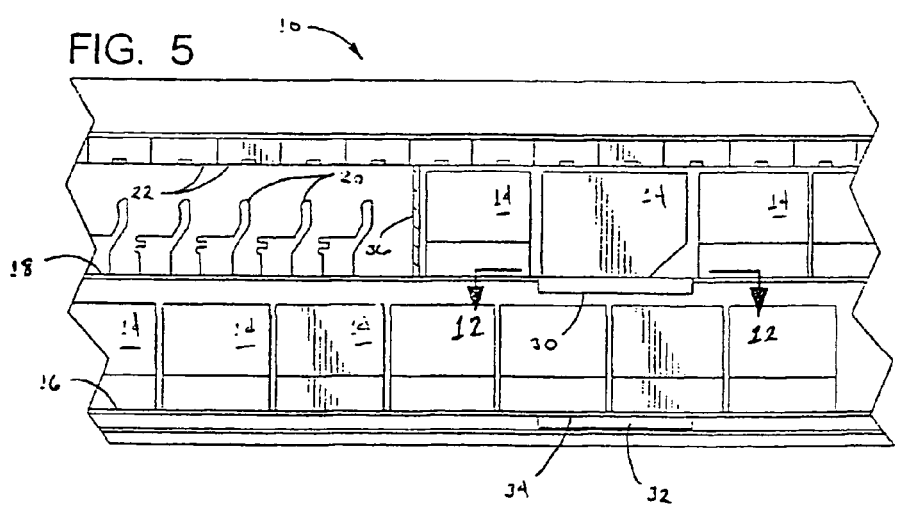

With a ULD in position on the lift platform, the internal mechanism of the platform is actuated to raise/lower the ULD through the opening 38 in the main deck, in the manner shown in FIG. 4. When the platform reaches the raised position so that its upper surface is generally flush with that of the main deck 18, the pallet is moved off of the platform, e.g., in a forward direction towards the divider panel 36 or in a rearward direction towards the tail of the aircraft. The tracks remaining from the removed seats may be employed to support the ULDs for movement through the passenger cabin. The final pallet/ULD may remain in position atop the lift platform when the latter is locked in its raised position, as shown in FIG. 5. The track segments 34 can then be reinstalled over the floor cutout 32 and additional cargo containers moved into place in the area below the raised lift platform 30; since the supports and drive mechanisms are essentially self-contained, there are no obstructions below the platform that would interfere with passing/storing cargo containers thereunder. Unloading the aircraft using the cargo lift assembly is essentially the reverse of the loading process, lowering the ULDs from the passenger deck 18 and then passing them through the cargo hold and out the main loading door in a conventional manner.

As shown, the lift assembly is preferably installed in the aft portion of the aircraft, but forward of the rear passenger door.

Positioning the lift forward of the door avoids a "log jam" situation that could interfere with traffic flow, while rearwardly of the door the fuselage typically tapers in a manner that would impose impractical geometry and space restrictions. Furthermore, the barrier panel can be positioned as far forward as desired, so as to avoid separating any remaining passenger area from the crew spaces or from the main passenger-loading door at the front of the aircraft. It will be understood, however, that the lift assembly may be installed in other locations as desired.

Since in the illustrated embodiment the lifting and stabilizing mechanisms are all contained within the lift platform and the associated deck opening, very little modification of the aircraft is required to install the system. The main modification is to cut the through opening in the passenger deck 18; as is described in greater detail below, the lift deck is preferably tied structurally to the main deck when in the stowed position, so that there is virtually no loss or compromise of structural integrity due to the opening 38. The receiver opening 32 in the lower deck also does not significantly affect structural integrity, since the portion of the frames that is removed does not serve a structural purpose with respect to the aircraft body and is only provided to support the overlying floor surface. Finally, power requirements are met by simply connecting an electrical cable to the platform, to supply electrical power to the motor that is housed therein.

Figure 6:
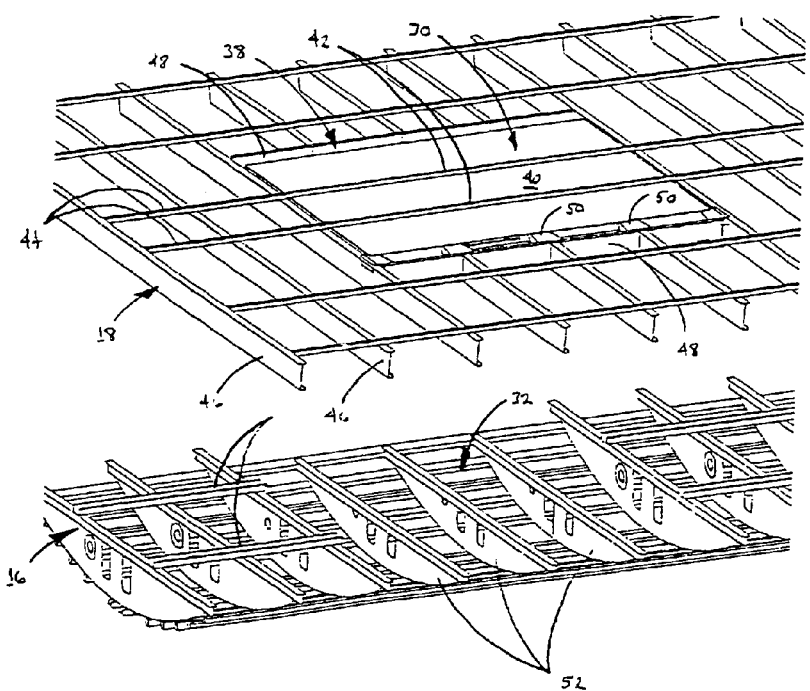
FIG. 6 is an enlarged, perspective view of the cargo lift assembly of FIGS. 1-5, showing its relationship to the cargo and main decks of the aircraft in greater detail.
Figure 7:
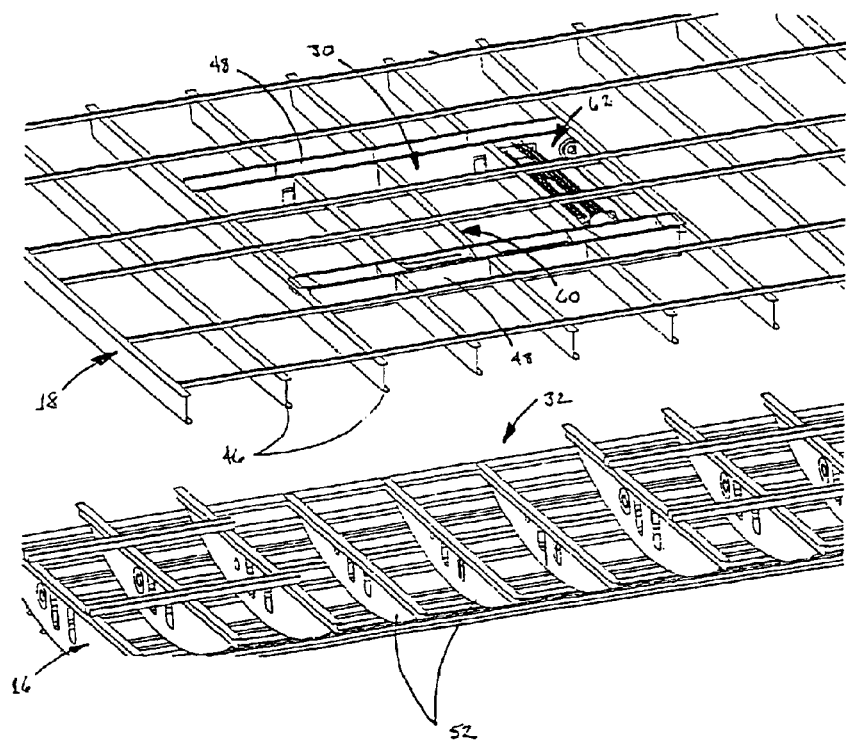
FIG. 7 is a perspective view of the cargo lift assembly of FIG. 6, with the upper floor surface of the lift platform being removed so as to shown the position of the internal drive mechanism thereof in greater detail.

FIGS. 6-7 show the relationship of the lift platform 30 to the main and cargo decks in greater detail. As can be seen in FIG. 6, the lift platform nests closely within the opening 38 when in the raised position, with its upper surface lying generally flush with that of the passenger deck 18 to form a substantially continuous floor and form part of the divider structure separating the upper and lower components. First and second track segments 42 align with corresponding tracks 44, (e.g., conventional seating tracks) on the surface of the passenger deck, and may be used for moving ULDs/cargo off and onto the lift platform 30; similarly, the upper surface of the platform may in some embodiments be provided with castoring rollers or other mechanisms for movement of containers/cargo thereover.

The through opening 38 in the deck itself is suitably formed by cutting an area out of the floor and deck support beams 36, and then installing headers 48 that join the severed beam ends to the uncut beams at the forward and rearward ends of the opening. Locking mechanisms 50 are mounted at the inboard sides of the headers, at the location of each cut beam, for forming a structural engagement between the platform and the deck, as will be described in greater detail below.

The lower opening 32, in turn, can be formed by cutting down the upper edges of corresponding floor frames 52, to a height that generally matches that of the lift platform 30 so that the upper surface of the latter will be level with the floor of the cargo deck 18 when the platform is in the lowered position; as noted above, this does not compromise the structural integrity of the aircraft, since the upper edges of the floor frames only support the floor panels and tracks of the cargo compartment rather than serving a load carrying function with respect to the fuselage. Tracks 54 are mounted to the cargo deck floor and align with the removable track segments when the latter are in place.

Figure 8:
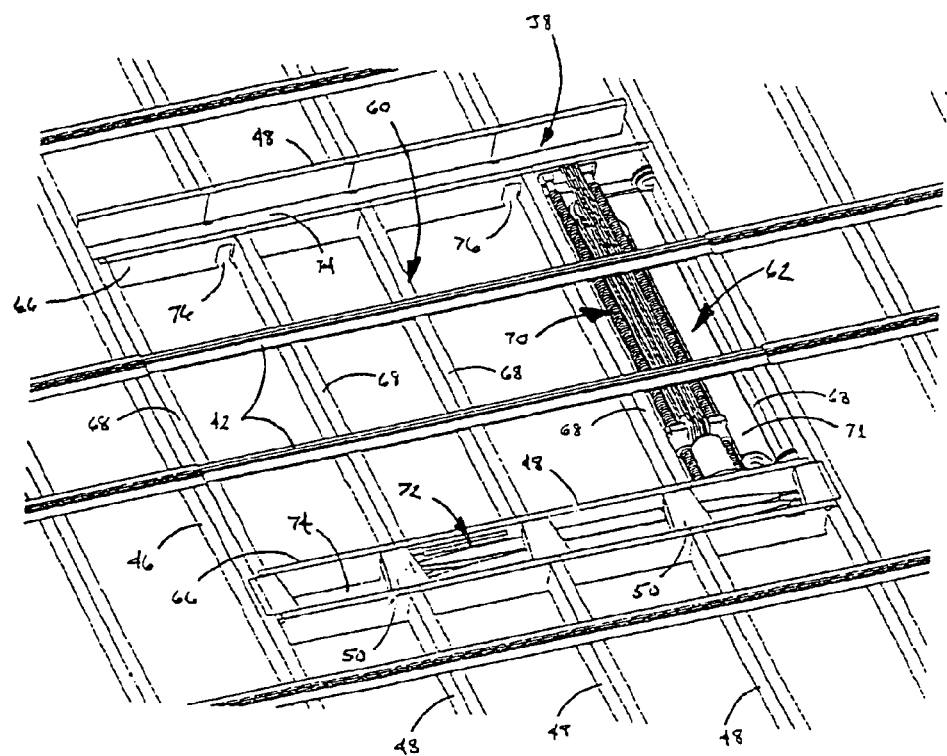
FIG. 8 is a perspective view of the cargo lift assembly of FIGS. 6-7, viewed from a higher angle so as to shown the internal components thereof in greater detail.

As can be seen in FIGS. 7-8, the lift platform of the illustrated embodiment includes a frame 60 within which the entire operating mechanism 62 of the lift apparatus is mounted. Consequently, when in the stowed position, the lift platform essentially forms a part of the main passenger deck, with no obstructions projecting into the overlying or underlying spaces.

The frame 60 is substantially rectangular in outline, with longitudinally-extending side beams 66 that are joined by a series of transverse beams 68; as can be seen in FIG. 8, each of the transverse beams 68 is preferably aligned axially with one of the transverse deck beams 48, so that when the lift platform is in the raised and locked position the transverse beams of the platform correspond to, and substitute structurally for, the segments of the deck beams that were removed in the formation of the lift opening 38.

As can be seen with further reference to FIG. 8, the actuating mechanism 70 is mounted across an end of the frame 60, within the vertical and horizontal space 71 defined by the side beams 66 and two of the transverse beams 68. First and second scissors-action stabilizing mechanisms 72 (one only being shown in FIG. 8) are mounted along the longitudinal sides of the frame, in the spaces 74 between the side beams 66 and the headers 48. As can also be seen in FIG. 8, notches 76 are formed in the bottom edges of the two side beams, to provide clearance for the floor frames of the cargo deck when the platform is lowered into the bottom recess 32, in the position shown in FIG. 9.

Figure 9:
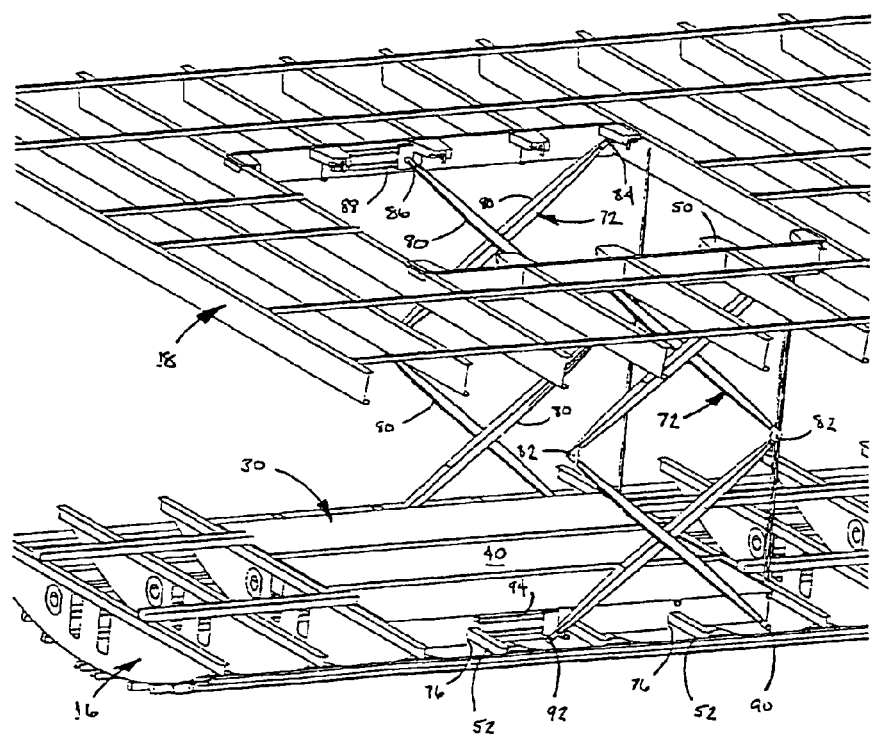
FIG. 9 is a perspective view of the cargo lift assembly and decks of the aircraft of FIGS. 1-5, showing the configuration of the lift apparatus when in a lowered position for receiving/discharging ULDs on the cargo deck of the aircraft.

As can be seen in FIG. 9, each of the scissors-action stabilizing mechanisms includes four rigid arm members 80 arranged in upper and lower X-shaped pairs, that are joined at their ends by pivot connections 82. The upper end of one member in each upper pair is mounted to one of the headers 48 by a stationary pivot connection 84 (one only being visible in FIG. 9), while the upper end of the other member is attached by a second pivot connection 86 to a linear guide 88 that accommodates changes in distance that develop between the two pivot connections 84, 86 as the lift platform is raised/lowered. Similarly, the lower ends of the two bottom pair members are attached by a stationary pivot connection 90 and a moving pivot connection 92 on each side of the platform, each moving pivot connection being mounted to a linear guide 94.

The scissors-action mechanisms on the two sides of the lift platform stabilize the lift platform against side-to-side and fore-to-aft motions as it is being raised/lowered, as well as against tipping/tilting forces caused by the load. The rigid members are formed of any suitable rigid, high strength material, such as steel or aluminum, and are suitably tapered as shown, in the interest of minimizing weight.

Figure 10:
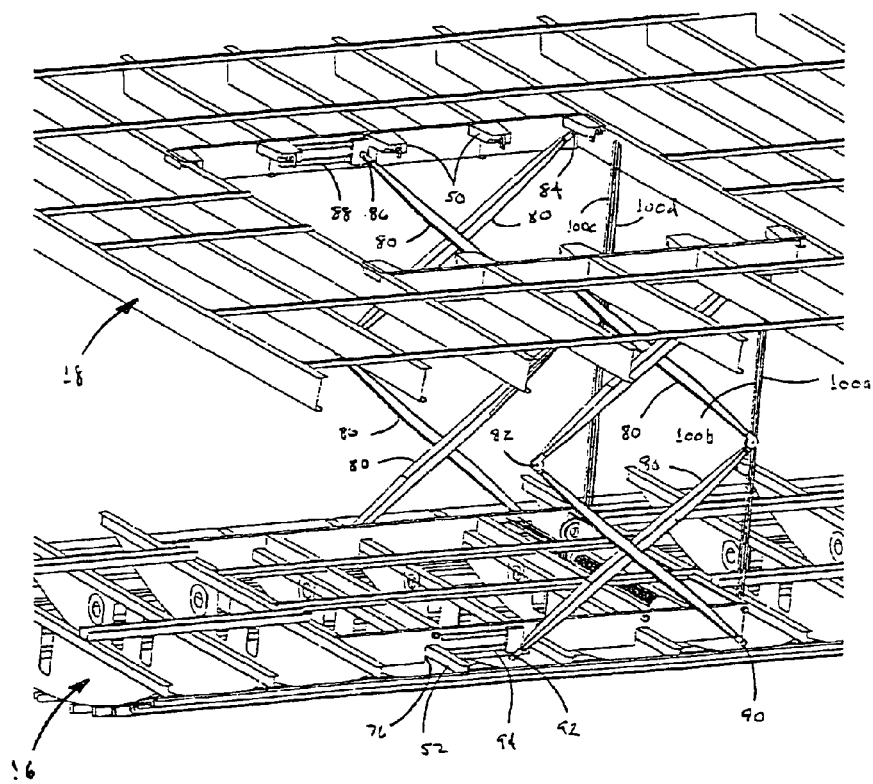
FIG. 10 is a perspective view of the cargo lift assembly in the lowered position, similar to FIG. 7, with the upper floor/cargo of the lift being removed so as to show the positions of the internal mechanism thereof in greater detail.
Figure 11:
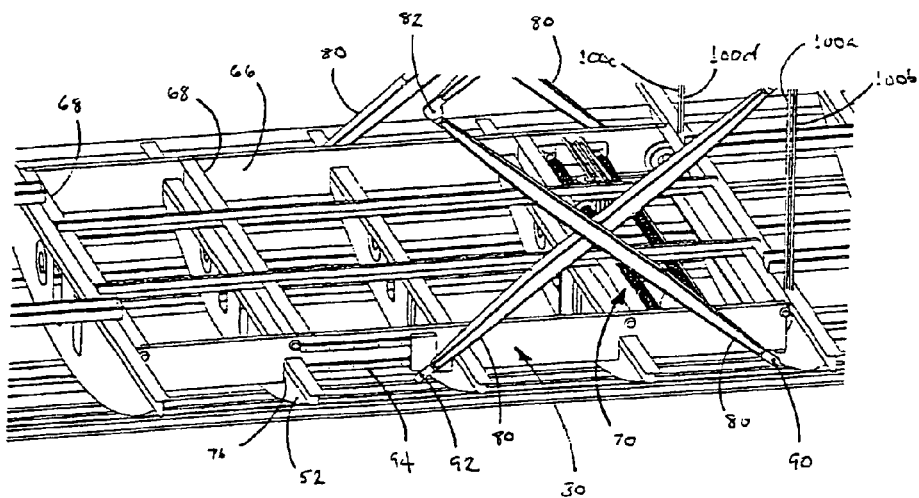
FIG. 11 is an enlarged, perspective view of the lowered cargo lift assembly, similar to FIG. 10, but viewed at a higher angle, showing the position of the mechanism and components in greater detail.

The actual raising/lowering of the lift platform is accomplished by means of cables that are attached to the pulley mechanism 70. As can be seen in FIGS. 9-11, one end of each of the cables 100*a-d* is attached to the stationary transverse beam at an end of the lift opening 38, while the other ends are lead to the pulley mechanism that is housed within the lift platform itself. The cables are preferably formed of synthetic fiber rope, although any suitable non-metallic or metallic material, or combinations thereof, may be used.

As can be seen in FIGS. 12 and 17-19, the actuating mechanism 70 includes twin ball screws 102*a*, 102*b* that span the distance between the two side beams of the frame, the ball screws being driven by an electric motor 104 and reduction gear 106. A paired travelling nut 108 is in threaded engagement with both ball screws, and supports pulley set 110 on a common shaft that extends transversely between the individual traveling nuts 112*a*, 112*b*. Rotation of the screws by the motor and reduction gear selectively moves the paired traveling nut in one direction or the other (i.e., towards one end or the other), depending on the direction of rotation of the motor. The base ends of the cables are mounted to anchor points on a plate 114 on the frame member 66 at one end of the actuating mechanism, from which the cables are routed over the pulleys carried on the travelling ball nuts so that the cables are paid out or retracted as the travelling nuts move one way or the other. Additional pulleys redirect the cables in a vertical direction, with the distal ends of the cables being mounted to the stationary deck beam as noted above. The end plate 114 also carries the bearings 116*a*, 116*b* that support the distal ends of the ball screws.

The ball screw mechanism employed in the illustrated embodiment possesses significant advantages, notably in terms of low-friction and the ability to withstand high thrust/loads, however, it will be understood that other screw-type and non-screw type linear actuators may be used to extend/retract the pulley or pulleys in some embodiments, such as roller-screw actuators, jack-screw actuators, hydraulic actuators, telescoping actuators and pneumatic actuators, for example. An important aspect of linear actuators with respect to the present invention is that the generally axial geometry of the mechanism (as compared with a winch drum, for example) reduces bulk in the other dimensions, which as described below enables it to be mounted with the axis parallel to the main plane of a deck or other divider structure so as to be housed entirely within the confines of the structure and therefore avoid impinging on the interior volume of the aircraft.

FIGS. 17-19 show the configuration of the pulleys and cables in greater detail: In FIGS. 17-18, the assembly is shown in the retracted position, with the travelling nut assembly located towards the left adjacent to the drive motor, while FIG. 19 shows the travelling nut assembly moved towards the right so that the cables are paid out from the assembly in an extended position.

As can be seen, the pulley set 110 that is carried on the pair of travelling nuts includes first and second paired, stepped pulley units 120*a*, 120*b*. The cables are led in pairs —100*a*, 100*b* and 100*c*, 100*d*—from the base plate 114, longitudinally (i.e., parallel to the ball screws) over the two stepped pulley units 120*a*, 120*b*, and then in reverse direction back towards the base plate. The cable pairs are redirected in a horizontal direction outwardly from the actuating mechanism by a set of vertical-axis stepped pulleys 122*a*, 122*b*, and are then redirected into vertical legs by horizontal-axis stepped pulley units 124*a*, 124*b*; a second vertical-axis stepped pulley unit 126 is used to lead cables 100*a*, 100*b* to the opposite end of the assembly, but is not required for the other cable pair 100*c*, 100*d*. The stepped pulley sets serve to ensure equal travel of the cables, i.e., the cables are routed over the larger- and smaller-diameter pulleys in each set so that the travel is the same despite the offset distance between the cables in each pair 100*a*, 100*b* and 100*c*, 100*d*.

Accordingly, actuating the motor in a first direction so as to cause the travelling nut assembly to move towards the motor (i.e., to the left, as shown in FIG. 17) increases the distance between the paired pulley set 110 and the base plate 114. This in turn increases the length between the paired pulleys and the base plate, and the lower cable leg between the pulleys 110 in the vertical axis pulley sets 122*a*, 122*b*, so that the cables are retracted into the lift platform and the latter is drawn to its raised position, as shown in FIGS. 6-8. Operating the motor in the reverse direction causes the travelling nut assembly 108 to move in the opposite direction (towards the right as viewed in the figure) shortening the distance between the pulley set 110 and the base plate 114. This causes the cables to be paid out from the actuating mechanism, lowering the lift deck to the position that is shown in FIGS. 9-11.

The preferred actuating system that is shown in the figures provides a 2:1 ratio of platform movement to pulley movement, which is a significant factor allowing the actuation system to be nested laterally within the platform.

Use of twin ball screws prevents eccentric loading on the travelling nuts should a cable fail; the load on a single ball screw may increase but there would not be any induced bending. The use of multiple cables also provides a degree of redundancy and added safety; the cables are preferably sized so that any single cable is capable of supporting the platform against falling in the event that the other cables are damaged or fail. Moreover, use of cables on two sides of the platform rather than at a single attachment point reduces torsion and bending loads during operation of the system.

The power requirements of the electrical motor 104 are easily met by either ground or onboard (aircraft) sources, supplied to the motor by an electrical cable as described above.

It will be appreciated that the geometry and dimensions of the lift mechanism that allow it to be housed within the confines of the lift platform similarly enable it to be mounted within the confines of a deck having a somewhat corresponding structure and interior height. For example, FIG. 20 shows an installation 330 in which the lift mechanism 332 is mounted in the deck 334 of the aircraft, rather than in the lift platform 336 itself. As can be seen, the mechanism is mounted within the vertical extent of the deck in the space between adjacent transverse beams 338*a*, 338*b*, aft of the opening 340 that accommodates the lift platform 336.

In the embodiment that is illustrated in FIG. 20, the lift mechanism is a "doubled up" version of that which is shown in FIGS. 17-19, with a central motor assembly 342 that drives pairs of ball screws 344 on either side, the outboard ends of the ball screws being supported in plates 346 mounted on longitudinal beams 348*a*, 348*b* that span the transverse beams 338*a*, 338*b*. In a manner similar to that described above, operation of motor 342 in a first direction actuates ball screws 344 to drive travelling nuts 350 outwardly towards the end plates, so that the pulleys 352 pay out the cable pairs 354, while operation of the motor assembly in the reverse direction draws the travelling nuts and pulleys back towards the center of the mechanism so as to retract the cable pairs.

As can be seen with further reference to FIG. 20, the cable pairs 354 extend outwardly from the pulleys in a horizontal direction, through openings in the longitudinal beams 348*a*, 348*b*, and are redirected 90° within the horizontal plane by vertical axis pulleys 356*a-b* and 358*a-b*. The cable pairs are led forwardly from the latter along the sides of beams 348*a*, 348*b*, passing through cooperating openings in the intervening transverse beams, to forward and aft sets of vertical axis pulleys 360*a-b* and 362*a-b* which are located outboard of opening 340 and generally proximate the corners of lift platform 336. The vertical axis pulleys redirect the cable pairs another 90° in the horizontal plane, inwardly towards platform 336, and over horizontal axis pulleys 364 set in cooperating openings in the longitudinal beams 348*a-b*. The distal ends of the cable pairs 354 are attached to the lift platform 336, proximate the four corners thereof. Thus, in response to being paid out by mechanism 332, the cable pairs 354 are rerouted by fore and aft pairs of horizontal axis pulleys 364*a-b* and 366*a-b* to lower the lift platform, out of opening 340 and downwardly towards the lower deck as shown in FIG. 21 (the platform being out of view therein). Operating motor 342 in the opposite direction raises the lift platform away from the lower deck and back into opening 340, returning it to the position shown in FIG. 20. Cargo/containers can therefore be transferred between the upper and lower decks in the manner described above, e.g., carried on the rail segments 368 of the platform.

It will be understood that while in FIGS. 20-21 the lift mechanism is shown mounted within the aircraft deck immediately adjacent the opening for the lift platform, in other installations the mechanism may be housed within the deck at a location further remote from the lift opening, with the cables being lengthened as needed. Furthermore, in some installations the mechanism may be mounted in a vertically aligned divider structure (e.g., a 9G Barrier) rather than in a horizontal deck as illustrated. In addition, it will be understood that some installations may utilize a "single-sided" lift mechanism such as that shown in FIGS. 17-19, rather than the "double-sided" mechanism shown in the example of FIGS. 20-21.

FIGS. 14 and 15 show more clearly the manner in which the scissors-action guide mechanisms extend and collapse as the platform is raised and lowered. As can be seen in FIG. 14, the collapsed scissors mechanism 72 nests entirely within the height of the main passenger deck 18 itself, so that there are no projections above the floor that would interfere with use of the passenger space 130, nor any below the lower edges of the lower deck beams that would interfere with use of the full volume of the lower lobe cargo compartment 132.

As can be seen more clearly in FIG. 15, the upper and lower pairs 134*a*, 134*b* of members in each of the scissors-action stabilizing mechanisms is joined by a central pivot connection 136 in an X-shaped configuration. As was noted above, the adjoining ends of the upper and lower X-shaped pairs are in turn joined by pivot connections 82. Preferably, all the pivot connections, including those on the upper deck (84, 86) and on the lift platform (90, 92), have axes that are aligned in the horizontal direction, so that the mechanism is able to collapse in the vertical plane while remaining stable in the horizontal plane.

As the lift platform is lowered, the distance shortens between the fixed and moving pivot points 84, 86 and 90, 92, at the upper and lower ends of the scissors-action mechanism, as shown in FIG. 15. As the platform is raised in turn, the ends spread apart, increasing the distance between the fixed and moving pivot connections. As was noted above, this relative movement is accommodated by the upper and lower linear guides 98, 94 on which the moving pivot points are mounted.

FIG. 16 shows the structure of the linear guides in greater detail, and also the manner in which the upper and lower pairs of scissors-action members nest atop one another between the lift platform and the stationary deck. As can be seen, each of the linear guide assemblies 88, 94 includes a pair of parallel, guide rails 140, those of the upper guide assembly being mounted to the headers 48 at the sides of the opening 38, and those of the lower guide assembly being mounted to the two side beams 66 of the lift deck.

Each of the guide assemblies in the illustrated embodiment includes a stationary, parallel pair of T-shaped (in cross section) rails 140 that are received in corresponding parallel channels in sliding bracket members 144, so that the latter are free to slide in a horizontal direction while being supported vertically. The pin 92 that forms the lower sliding pivot is mounted to a downwardly projecting portion of the outboard, lower sliding bracket member, while the pivot pin of the upper pivot joint is mounted to the upper sliding bracket member. As can be seen in FIG. 16, the axes of the upper and lower pivot pins 86, 92 are parallel to one another and are offset vertically to allow the members 80 of the upper and lower scissors action assemblies 134*a*, 134*b* to stack atop one another as noted above. In addition, the upper pivot pin 86 is elongated, so as to space the rigid member 80 that is connected thereto away from the sliding bracket by a distance sufficient to accommodate the neighboring rigid member of the upper pair.

The guide rails 142 and/or the channel portions in which they are received may be formed of metal, provided with suitable lubrication. In some embodiments, however, either or both may be formed of a polymeric material having low friction and self-lubricating characteristics combined with strength and durability, such as Delrin™, for example.

Linear guide assemblies that have been described above have the advantages of compactness, durability and ease of maintenance. It will be understood, however, that other types of linear guide mechanisms known to those skilled in the relevant art may be employed in other embodiments of the invention.

As noted above, the cargo lift system of the present invention can be installed without significantly affecting the structural integrity and load capacity of the aircraft, and of the main passenger deck in particular, due to the lift platform in effect becoming an integral part of the deck structure when in the up/stowed position. This is a very significant advantage since, in addition to the general loading due to passengers or cargo, the floor beams of the passenger deck carry significant lateral load in a pressurized aircraft. Consequently, it is desirable to maintain lateral continuity in the deck in order to ensure minimal changes to the fuselage loads during flight.

As can be seen in FIG. 13, the locking mechanisms 50 are mounted on the two longitudinal sides of the lift opening 38, at the ends of the truncated floor beams 46. Consequently, when latched to the raised lift platform, the latch mechanisms connect the ends of the beams to the transverse beams of the platform so as to essentially establish continuity for each beam across the entire deck.

As can be seen in FIG. 22, each of the latch mechanisms 50 includes a locking cam 150 having a receiver 152 mounted at the distal end of a rotatable shaft 154. The opposite end 156 is mounted to an actuating linkage (not shown), such as a shaft-operated bell-crank linkage that rotates all of the cam locks simultaneously. A cover flange 58 projects from the header 48 over the top of the latch mechanism, to protect the mechanism and also to support the floor panel 159 (see FIG. 13) about the perimeter of the opening 38.

The receivers 152 engage locking pins or lugs 160 that are mounted to the side beams 66 of the lift platform 30. As can be seen in FIG. 23, each of the locking pins in the preferred embodiment includes a short, generally cylindrical head portion 162 having bevelled edges 164 and a flat, circular top 166, and a reduced-diameter base portion 168. The locking pins 160 are mounted to the edges of the lift deck 30 by welding or other suitable means.

As can be seen in FIG. 24, the receiver portions of the cam latches each include a generally semi-circular receptacle area 170 that is sized and shaped to receive the cooperating pin member 160 in locking engagement therewith, and a tangentially-extending ramp portion 172 for engaging the edges of the pin member and guiding it into the receptacle area. A channel having a flat base 174 extends along the inside surface of the ramp portion and into the receptacle area 170, for engaging the cylindrical wall 162 of the pin member, the channel being bordered by bevelled edges 176*a*, 176*b* that cooperate with the bevelled edges 164 on the pin member.

FIGS. 25-28 illustrate the sequential steps in engagement and locking of the latch and pin members 150, 160. As can be seen in FIG. 25, the latch and pin members are arranged in vertical alignment, with the latch member initially being rotated to a position in which the ramp portion 172 extends in a downward direction. Thus, as the lift deck is raised, the ramp portion 172 cooperates with the surfaces of the locking pin to direct the latter into the opening 178 of the semi-circular receiving area 170.

Once the pin member 160 has entered the receptacle area of the latching member, as shown in FIG. 26, the latter is rotated in the direction indicated by arrow 182 so as to draw in and capture the pin member within the receiver 152. In the final, latched position that is shown in FIG. 27, the pin member is supported vertically by the lower wall portion 184 of the latching member, and is restrained in the horizontal direction by the engagement of the bevelled edges 164, and 176a, 176b. The latch mechanism consequently transfers loads in all directions between the transverse beams of the deck and lift platform, so that the latter is, in a structural sense, integrated into the passenger deck 18 of the aircraft in the manner described above.

Accordingly, when the latches are in the locked position, loads are transferred directly from the truncated deck beams to the transverse beams of the platform, by the shaft portions of the latch mechanisms, so that lateral and vertical load carrying capabilities are preserved intact as compared with the unmodified floor structure. The spherical pin design provides lateral and vertical restraint while permitting limited rotation, thus reducing component size and strength requirements. It will be understood that the orientation of the components may be reversed from those that are shown, i.e., the pins in the cam latches can be mounted on either the platform or the passenger deck, depending on design factors.

The latch mechanism described with reference with FIGS. 22-27 thus provides significant advantages in terms of durability and reliable operation, however, it will be understood that other forms of latch mechanism may be used in some embodiments.

FIGS. 28A-31 illustrate a cargo lift apparatus in accordance with a second embodiment of the present invention, which is particularly suited to use with double-decker "jumbo" aircraft but is not limited thereto.

Figure 28A:
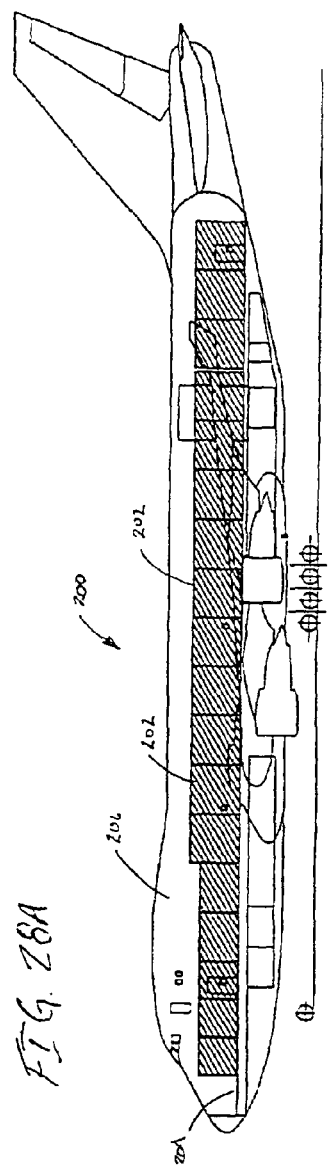
FIG. 28A is an elevational, cut-away view of a wide-body "jumbo" cargo aircraft, showing the manner in which cargo is ordinarily carried on the main deck thereof but not on the upper deck.

Accordingly, FIG. 28A shows a conventional "jumbo" aircraft 200 having a double-decker configuration, in this example, a Boeing model 747. When configured as a dedicated cargo carrier, palletized cargo is carried in ULDs 202 on the main deck 204 of the aircraft, i.e., the deck that would provide seating in a passenger configuration. Cargo is also carried in the lower lobe in a conventional manner. However, the upper deck of the aircraft, in the area indicated at 206, is unutilized.

Figure 28B:
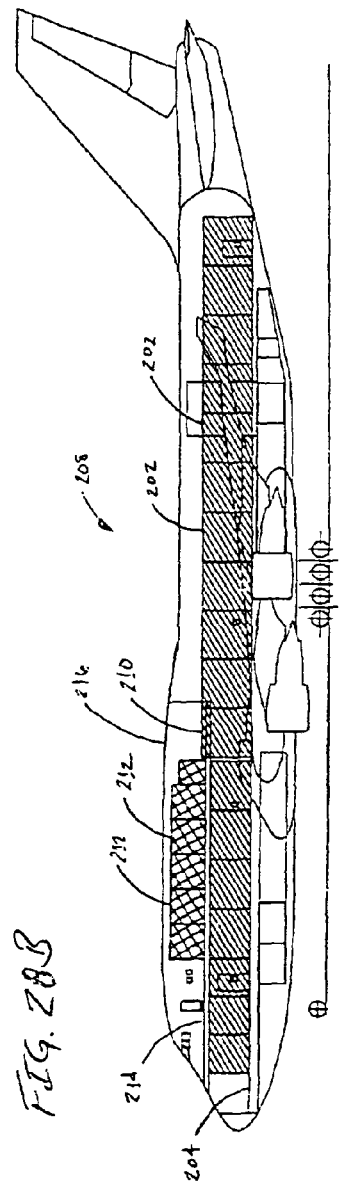
FIG. 28B is a second elevational, cut-away view of the aircraft of 28A, showing the manner in which a cargo lift in accordance with a second embodiment of the present invention allows cargo to be carried on the upper deck thereof, increasing the economic viability of an increased capacity conversion of the aircraft.

FIG. 28B, in turn, shows a modified aircraft 208 having a lift apparatus 210 in accordance with the present invention installed therein, which permits additional ULDs 212 to be raised from the main deck 204 to the upper deck 214. Not only does this make it possible to carry cargo in the previously unutilized space 206, it also renders it feasible to modify the aircraft to carry additional cargo on the upper deck by extending the upper fuselage compartment as shown at 216.

The lift apparatus 210 is broadly similar to that of the embodiment described above, in that it likewise utilizes a lift platform 220 that houses a substantially self-contained operating mechanism, and that mounts structurally to the upper deck when in the raised, stowed position. However, the lift and stabilization mechanisms are configured to accommodate the larger loads anticipated in a wide-body "jumbo" aircraft, as well as the greater height between decks and other differences in geometry. The lift platform 220 therefore lowers and raises between the upper and main decks 214, 204 of the aircraft, transferring ULDs 212 to/from the upper deck via the through opening 228. As was also described above, a divider panel 230 may be provided on the upper deck to section off the cargo space from other interior areas.

Figure 29:
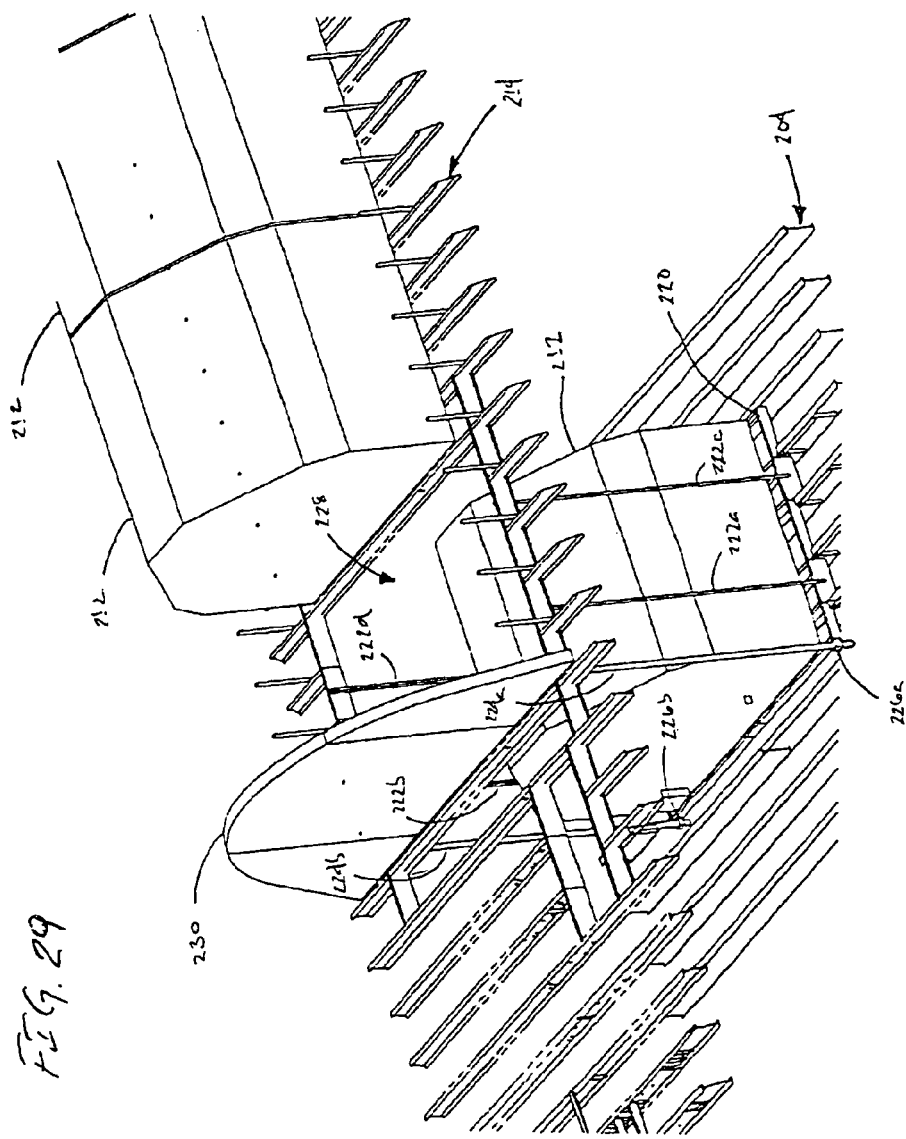
FIG. 29 is a perspective view of the main and upper decks of the double-decker "jumbo" freight aircraft of FIG. 28B, showing the manner in which the lift apparatus in accordance with the second embodiment of the invention raises cargo from the main deck to the upper deck thereof.

As can be seen in FIG. 29, the lift platform 220 employs four cable pairs 222a-d, that are paid out and retracted at the longitudinal sides of the platform, near the front and rear corners thereof. In addition, the platform is stabilized by leg members 224a, 224b that pivot downwardly and lock in a vertical position as will be described below, rather than the scissors-action stabilizer mechanism previously described.

Figure 30:
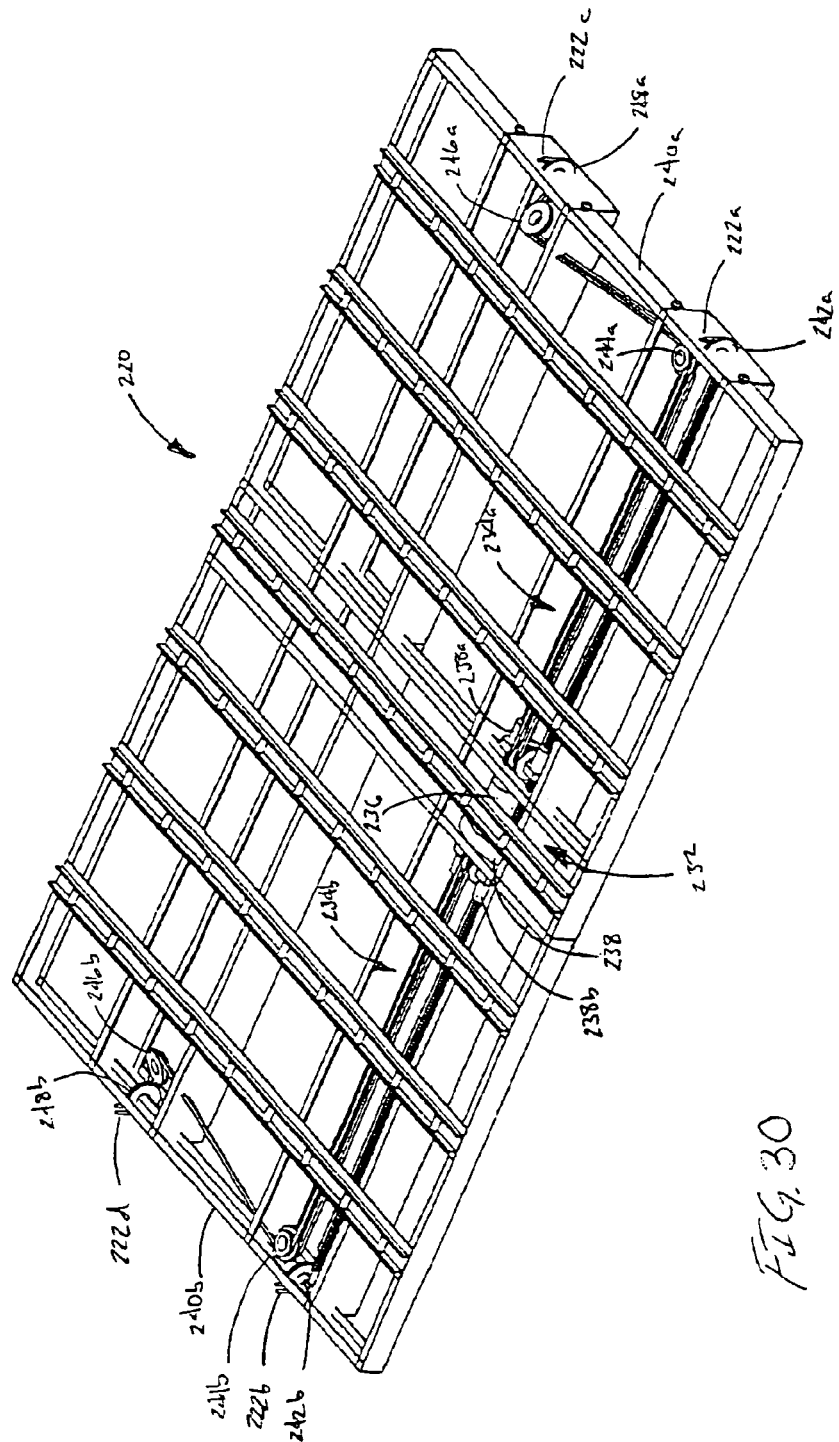
FIG. 30 is a perspective view of the lift platform of the lift apparatus of FIG. 29, with the floor of the platform being removed to show the internal mechanism thereof in greater detail.

FIG. 30 shows the lift platform 220 and its operating mechanism in greater detail. Similar to the embodiment described above, the drive mechanism 232 employs horizontally-extending ball screws and nuts that are encompassed within the vertical height of the deck. In this example, however, two paired ball screw and travelling nut assemblies 234a, 234b are provided for the two sides of the assembly, the ball screws being driven by a single, central motor 236 via a common gear box 238. Operation of the motor drives the two nut assemblies and their associated pulleys in opposite directions, i.e., so that they diverge outwardly towards the two side rails 240a, 240b of the platform and converge inwardly towards the motor 238, depending on the direction of rotation of the motor. As the travelling nut assemblies move towards the sides of the platform, the distance shortens between the pulley sets and the cable attachment points, so that the cable pairs are paid out from the platform, and vice versa. The cable pairs 222a, 222b that are located proximate the distal ends of the ball screws are redirected in a vertical direction by horizontal axle pulley sets 242a-242b, while the other cable pairs 220c-220d are first directed towards the other corner by vertical axle pulley sets 244a-244b, and are then redirected outwardly and then upwardly by vertical and horizontal axle pulley sets 246a-246b and 248a-248b (the axes of the pulley sets may be angled slightly from vertical/horizontal as to direct the cable pairs on to the shives of the pulleys in an efficient manner).

Thus, operating the motor 236 so as to pay out the cable pairs lowers the lift platform from the upper deck to the main deck as described above, while operating it in the reverse direction raises the platform back to the upper deck. The platform has an inherent degree of stability due to the location of the four cable pairs 222a-222d at its corners. Moreover, because each cable (which is suitably a synthetic fiber rope, as described above) is paired with a mate, a degree of redundancy is ensured in the event that any single cable should fail.

While the doubled-up arrangement of paired ball screw mechanisms thus provides significant advantages for certain applications, it will be understood that some embodiments may employ a single paired ball screw mechanism similar to that described above, in the interest of simplicity or economy for example, or even a single non-paired ball screw and nut; conversely, additional paired or un-paired ball screw mechanisms and associated drive motors may be used in some embodiments. Moreover, although attaching the cables at the sides of the lift platform/opening provides significant advantages in terms of stability and clearance for movement onto/off of the platform, it will be understood that in some instances the cables may be attached at the forward/aft ends of the platform instead of or in addition to the ends.

Figure 31:
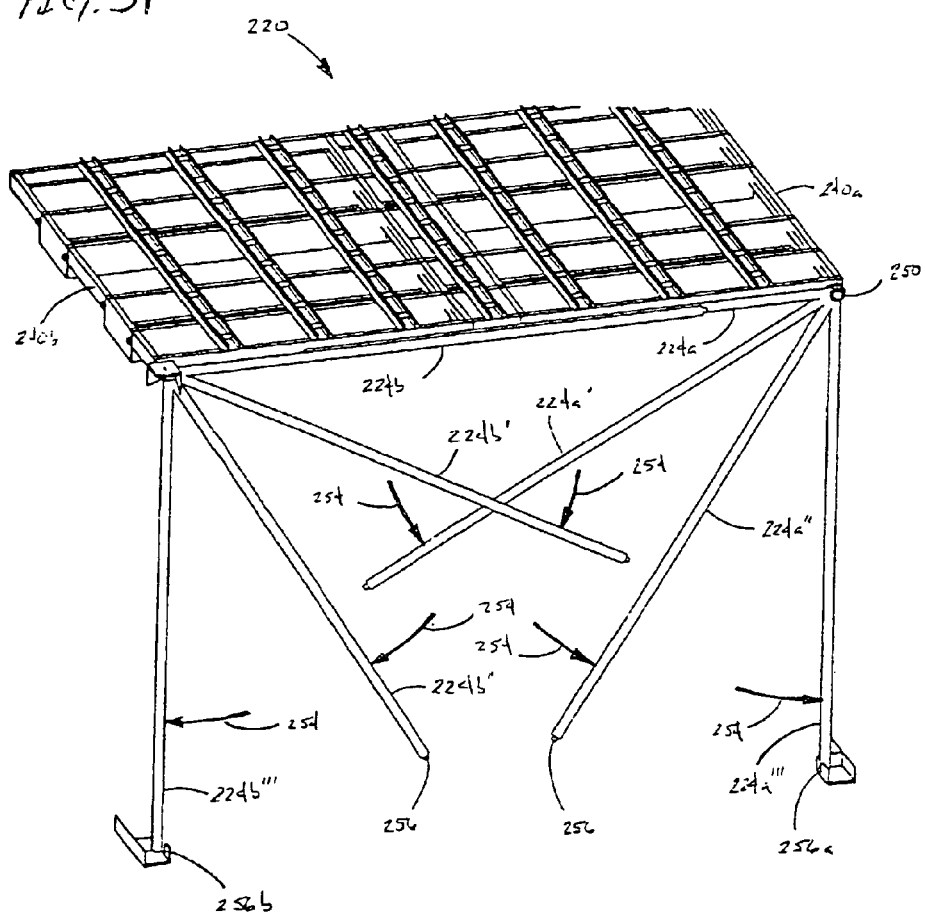
FIG. 31 is a second elevational view of the lift platform of FIG. 30, showing the manner in which the leg members thereof pivot downwardly and engage fittings in the lower deck to provide vertical guides that stabilize the platform as it is lowered and raised.

FIG. 31 illustrates the operation of the vertical guide legs 224a-224b. As can be seen, the two legs nest parallel to one another along one of the transverse edges of the lift platform when the latter is in its raised and stowed position.

Prior to actuation of the lift platform, however, the guide legs pivot downwardly, as indicated by arrows 254, passing progressively through positions 224a'-b' and 224a"-b", until reaching vertical alignment at position 224a'''-b'''. At vertical alignment, pin portions 256 on the distal ends of the legs enter sockets in receivers 256a-b on the main deck, so as to temporarily lock the guide legs in a vertical position.

Figure 32:
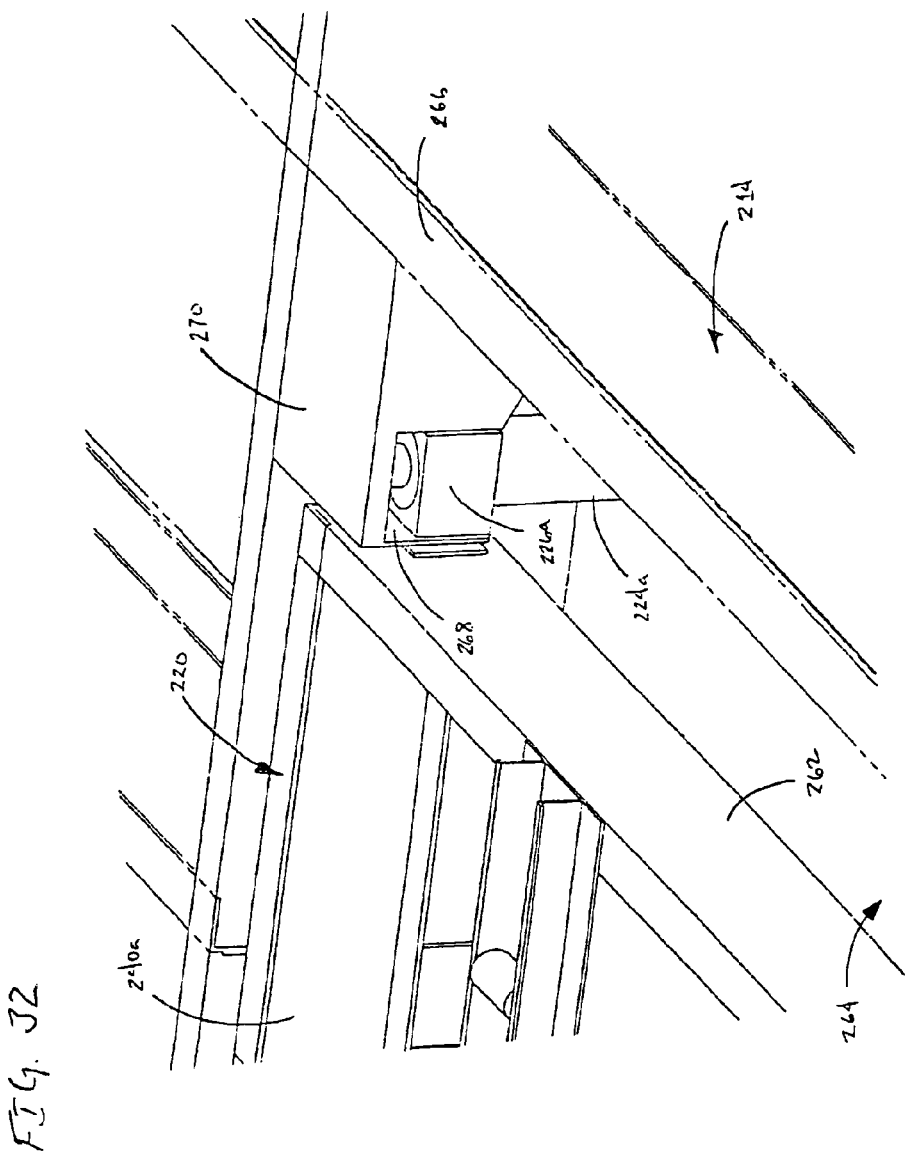
FIG. 32 is an partial, perspective view of the lift platform and one of the stabilizer legs of FIG. 31, showing the manner in which the upper end of the stabilizer leg and the associated sliding guide member are accommodated within a receiver structure that is mounted to the upper deck of the aircraft.
Figure 33:
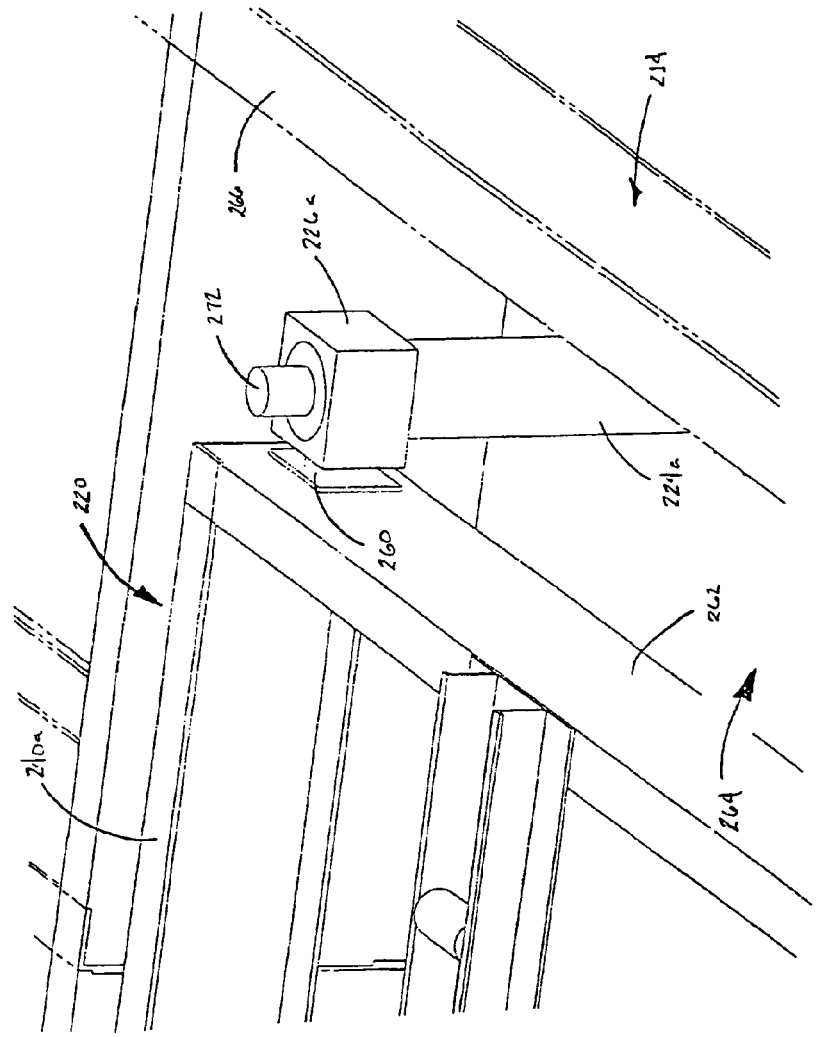
FIG. 33 is a partial, perspective view of the lift platform and upper end of the stabilizer leg, similar to FIG. 32, with the receiver being removed to show the pivotable mounting of the lift platform to the stabilizer guide block in greater detail.

As can be seen more clearly in FIG. 32, each of the guide legs 224a-b is received in one of the guide blocks 226a-b that form guide members in sliding engagement therewith. The guide blocks, in turn, are joined to the lift platform 220 by short stub axles 260, that project from one of the transverse edge beams 262 of the platform. Short blind bores in the guide blocks receive the stub axles in rotatable engagement, enabling the legs to pivot from the horizontal, stowed position to the vertical, deployed position, and vice versa, in the manner described above. When in the stowed position, the nested legs are accommodated within the spaced gap 264 between the transverse frame member of the platform and the transverse beam 266 at the edge of the deck opening.

When the lift platform 220 is in its raised position, the guide blocks 226*a-b* are accommodated within downward facing openings 268 of receivers 270 mounted to the upper deck (see FIG. 32). The receiver openings accommodate rotation of the guide blocks as the stabilizer legs are pivoted between their stowed and deployed positions. The receivers also include socket openings (not shown) that engage reduced diameter pin portions 272 at the upper ends of the legs, and that may be driven by a motor or other suitable means through a 90 degree arc (e.g., via a gear or crank linkage) to pivot the legs between the stowed and deployed positions.

In operation, the guide legs 224*a-b* are first deployed to their vertical orientation, with the pins on the lower ends of the legs being locked in the lower receivers 256*a-b*. The drive mechanism 232 of the lift platform is then actuated to lower and raise the platform, with the guide blocks 226*a-b* sliding along the vertical legs to stabilize the platform against motion in a side-to-side or front-to-rear direction.

As was noted above, a cutout in the underlying floor receives the lift platform when the latter is in its lowered position; when the platform has been raised and stowed, a pair of rails may be set across the cutout to span the opening. However, removing and replacing the rails involves a degree of delay, and moreover, this approach may not be satisfactory under circumstances where a more continuous floor surface is required.

FIGS. 34-44 consequently show a translating floor assembly in accordance with the present invention, that forms a generally continuous floor surface when raised, but that can be lowered to clear the receiving area for the lift platform when needed.

Figure 34:
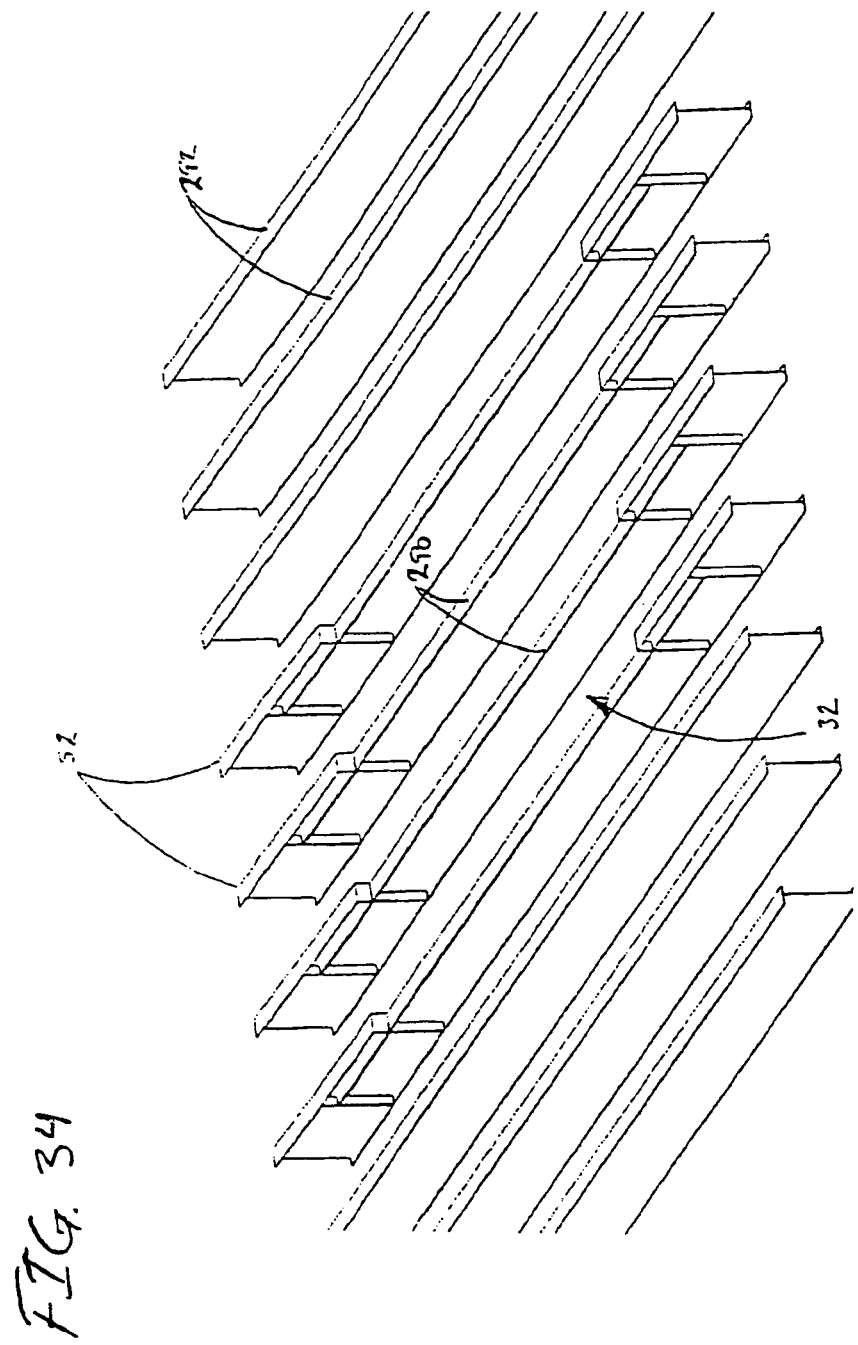
FIG. 34 is a perspective view of a portion of the cargo deck floor of the aircraft, showing an area in which the upper edges of the transverse floor frames are removed to form a recess that accommodates the lift platform when the latter is in the lowered position.

The first figure, FIG. 34, shows the floor recess 32 that receives the lift deck when it is in the lowered position, this area being formed (as noted above) by the cutaway, lowered upper edges 290 of lateral floor frames 52, that lie at a level below the floor surface that is defined by the upper edges 292 of the intact frames.

Figure 35:
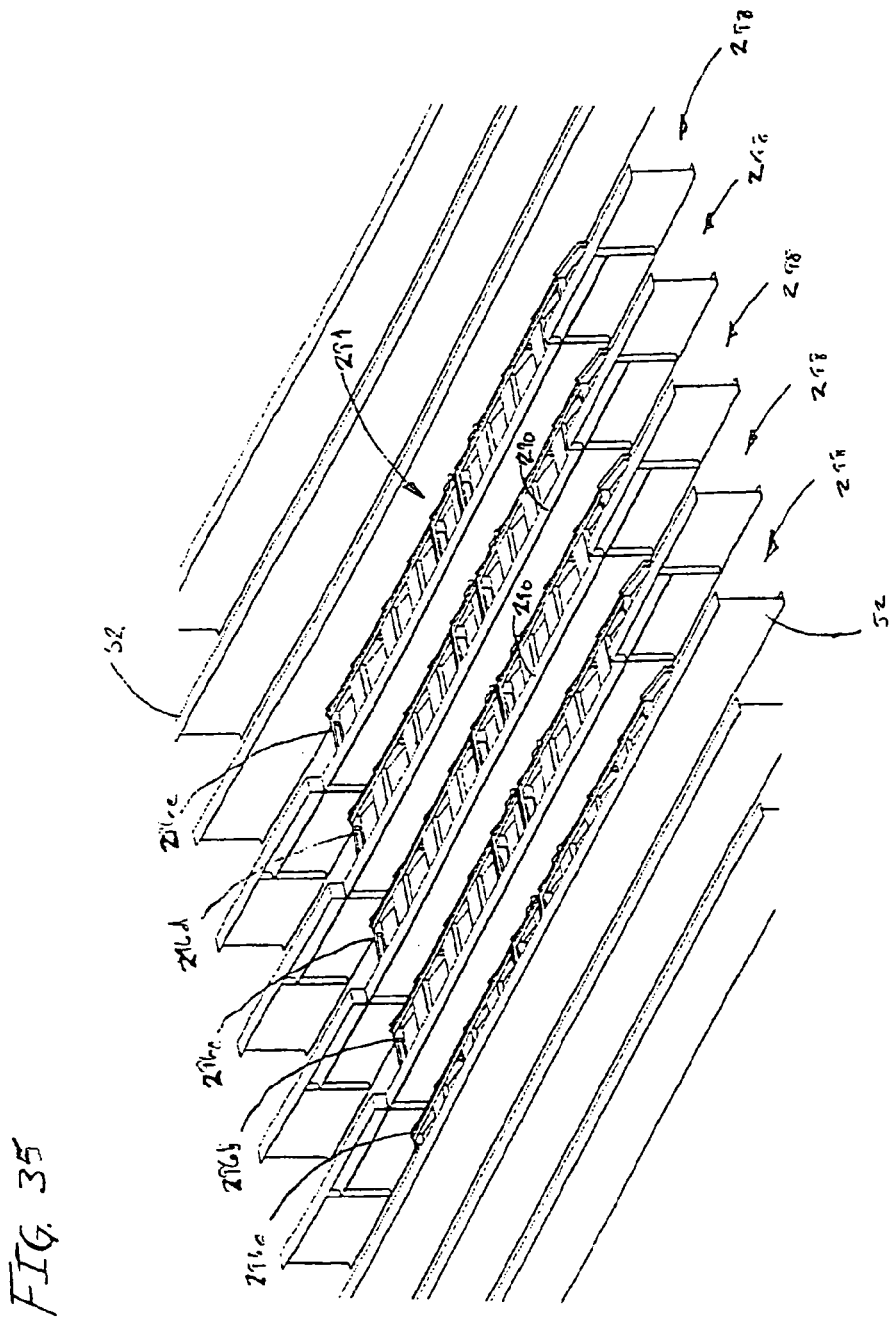
FIG. 35 is a second perspective view of the area of the cargo deck floor of FIG. 34, showing a translating, drop down floor assembly in accordance with the present invention installed in the spaces between the lateral frames, the assembly being shown in its lowered position in which the recess formed at the tops of the frames is cleared to receive the lift platform.

As can be seen in FIG. 35, the drop-away, translating floor assembly 294 is made up of a series of folding floor sections 296*a-e* that are mounted in the intercostal spaces 298 between the laterally extending floor frames 52, so that each of the cut-down frames is flanked by a pair of the folding sections. The assembly is shown in its lowered configuration in FIG. 35, with the sections 296*a-e* folded generally flat at the bottoms of the intercostal spaces. The lowered sections therefore lie below the level of the cutaway edges 290, so that the recess is cleared to allow the lift platform to be lowered therein in the manner described above.

Figure 36:
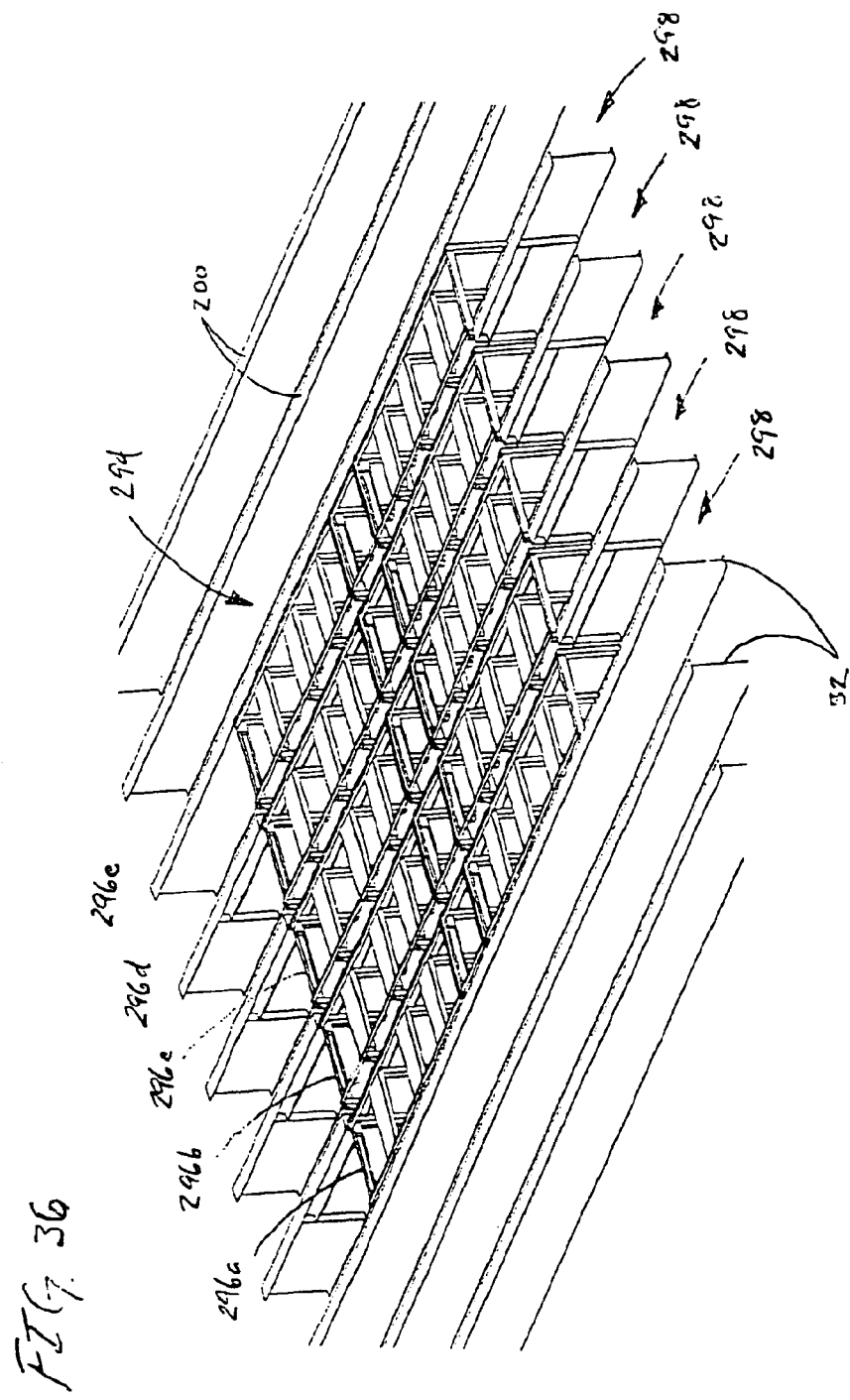
FIG. 36 is a second perspective view of the cargo deck floor and translating floor assembly of FIG. 35, showing the assembly in a raised position in which it forms a continuation of the cargo deck floor over the area of the recess after the lift platform has been raised and stowed.

FIG. 36, in turn, shows the floor assembly 294 in its raised position, with the series of floor sections 296*a-e* being unfolded and raised within their intercostal spaces so that in combination they define a floor surface that is generally continuous and level with the main floor surface that is defined by the upper edges 300 of the intact floor frames.

Figure 37A:
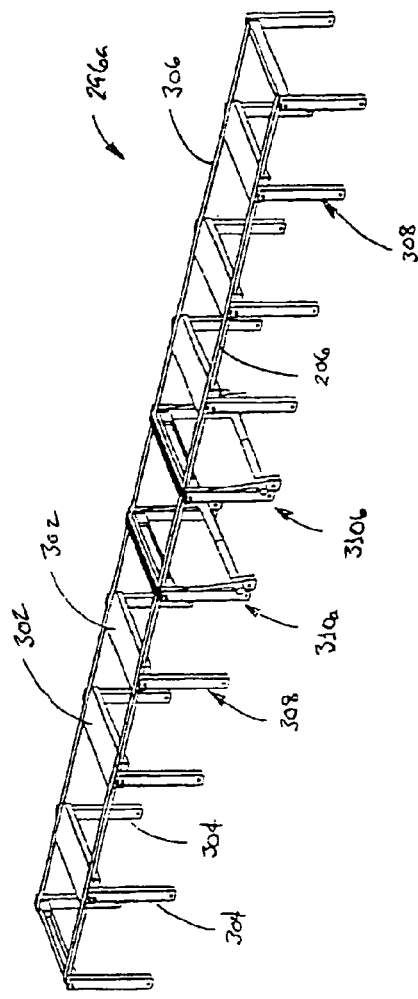
FIGS. 37A-B are perspective views of one of the folding sections of the translating floor assembly of FIGS. 35-36, showing the section in its raised and lowered configurations, respectively.
Figure 37B:
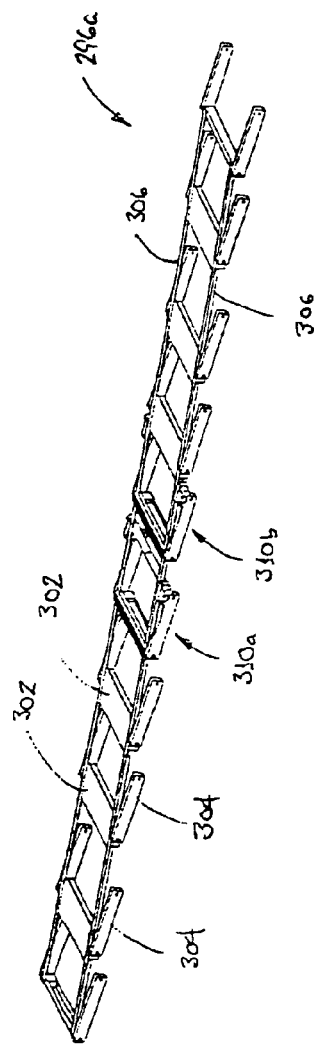

As can be seen in FIG. 36, each of the folding floor sections includes a series of short, longitudinally extending plate-like deck segments 302 supported at the ends by paired legs 304. The upper ends of the legs are joined by elongate rod members 306 that are pivotably mounted to the legs and that extend laterally within the intercostal space. The lower ends of the legs, in turn, are pivotably mounted to brackets (not shown) or other fittings towards the bottom of the intercostal space. The panels and legs thus form individual segments 308 that, being linked by the lateral rods 306, move in concert as the floor section is raised/lowered. The deck segments 302 are mounted fixedly to the lateral rod members 306, in co-planar relationship therewith, so that when the head of the section is in its raised position (as shown in FIG. 37A), the deck segments all lie horizontal in side-by-side relationship, level with the main floor surface. When the section is lowered, as shown in 35B, the deck segments (and the rod members 306) remain horizontal, but the support legs 304 pivot downwardly to lower them towards the bottom of the intercostal space. In the embodiment that is illustrated in FIGS. 37A-B, the deck segments 302 are comparatively narrow and are separated from one another by a series of gaps; in other instances, such as for use in the deck of a passenger area, the edges of the deck segments may meet, or the individual segments may be replaced with one or more laterally extending panels, so as to form a substantially continuous, uninterrupted floor surface when in the raised position.

Raising and lowering of the section is accomplished, in the illustrated embodiment, by means of a pair of actuator segments 310*a*, 310*b*. As can be seen in FIG. 32, each actuator segment includes a pair of support legs 312 having an open-sided channel configuration, which configuration can be used for the legs 304 of the other, unpowered segments as well. An elongate actuation link 314 is received in the open side of each of the legs of the powered segments, with its upper end being joined to the upper end of the leg by a horizontal axis pivot pin 316 that also serves to pivotably mount the upper end of the leg to one of the rod members 306 of the upper frame; in the embodiment that is illustrated, the rod members are spanned at the upper ends of legs 312 by longitudinal seat track segments, rather than planar deck segments, allowing seats to be installed thereon when the assembly is in its raised position. The lower end of each pivot link is joined to an actuation arm 316 by a second pivot pin 318, with the actuation arm in turn being fixedly mounted to an end 320 of a torque tube 322. The pivot pin 318 for the lower end of the actuation link is spaced from the end of the torque tube, so as to create a crank-arm when the torque tube is rotated. As can be seen, the actuation arm suitably has a channel configuration, with the end of the actuation link being received in the interior of the channel and the pivot pin 318 spanning between the sides thereof.

Rotation of the torque tubes (in a clockwise direction as seen in FIG. 38) causes the actuation links to draw on the upper ends of the support legs 312, pivoting the legs about their lower attachment points 324 and thus raising the upper frame and deck segments to their elevated position as described above. As the legs reach their vertical orientation, the lower ends of the actuation links rotate to an over center position (i.e., to a position on the opposite side of the torque tube from the support leg), locking the assembly in its raised position. The assembly is lowered by rotating the torque tubes in an opposite direction, which raises the ends of the actuation links from their over center positions, releasing the assembly from its locked configuration, and pivots the legs downwardly towards a horizontal orientation.

The torque tubes may be rotated by one or more motors (not shown) or other suitable drive devices. Rotation of the torque tubes is preferably linked so that all of the sections in the floor assembly 294 rise/fall simultaneously with minimal delay.

FIGS. 39-44 show a translating floor assembly 380 in accordance with another embodiment of the present invention, that also collapses to form a recess in the lower deck but does so utilizing a different structure and mechanism.

FIG. 39 shows the translating floor assembly 380 in the raised position. As can be seen, the assembly includes first and second floor segments 382, 384 that extend transversely across the bottom of the fuselage shell 386 and meet at a junction 388. As can better be seen in FIG. 41, each of the floor segments 382, 384 includes first and second parallel, spaced apart beam sections 390a-b and 392a-b, on top of which are mounted rail segments 394 that span the beam sections laterally so as to be aligned longitudinally with respect to the fuselage and deck. The rail segments 394 correspond to the installed rails (not shown) of the cargo deck, and likewise include rollers 396 for movement of containers/cargo thereover. When the assembly is in the raised position, as shown in FIGS. 39 and 41, the upper sides of the beam sections 390a-b and 392a-b of the two deck segments lie generally level with the upper sides of the installed beams 398 supporting the main cargo deck, so that the rail segments 394 are level and aligned with the installed rails of the cargo deck so as to be substantially continuous therewith.

Figure 42:
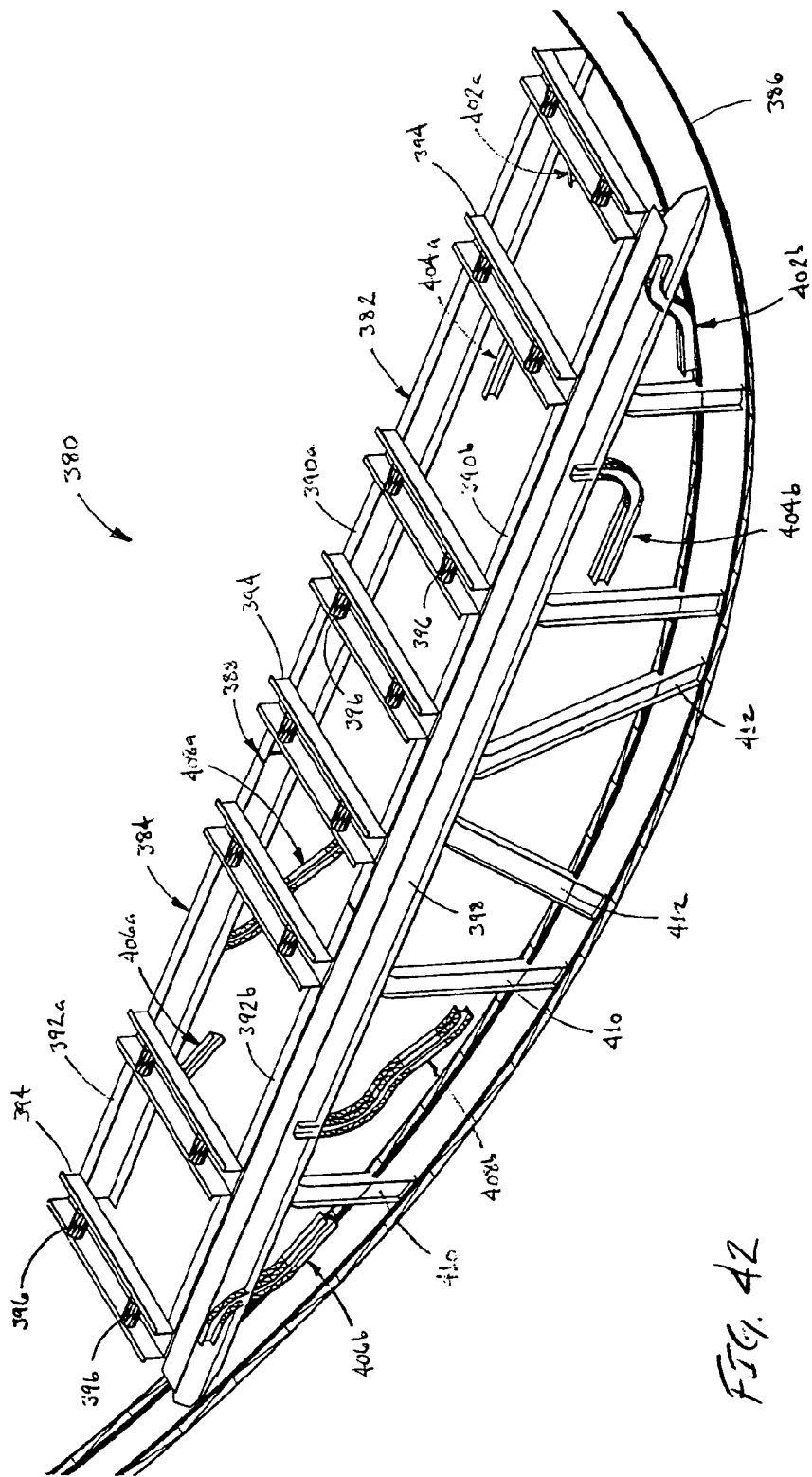
FIG. 42 is a rear perspective view of the drop down floor assembly of FIGS. 39-41, again showing the assembly in the raised position.

As can be seen with further reference to FIGS. 39 and 41 and also FIG. 42, each of the deck segments 382, 384 includes pedestal mounted guide rollers 400 mounted to and extending laterally from the outer sides of the beam sections 390a-b and 392a-b. A first pair of the guide rollers 400 is mounted proximate the base (outboard) end of the first deck segment 382, and a second pair is mounted at a position spaced distally thereof, approximately one-third of the distance inboard towards junction 388 in the embodiment that is illustrated; similarly, the second deck segment 384 includes a pair of guide rollers mounted proximate the base end thereof and a second pair mounted at a spaced distance distally, approximately one-half of the distance inboard to junction 388. Each pair of guide rollers is received in a corresponding pair of generally inwardly and downwardly sloped guide channels 402a-b, 404a-b, 406a-b and 408a-b, the guide channels being sized to form tracks for movement of the rollers 400 therethrough. The guide channels are in turn mounted to the deck beams 398 or other structure of the cargo deck, the latter being supported from the fuselage shell 386 by vertical and angled stanchions 410, 412 in a conventional manner (in order to better illustrate the guide mechanism, the deck beam and other structures supporting the guide channels 402a, 404a, 406a and 408a forward of the translating deck are not shown).

Each pair of guide channels follows a contour such that they cooperate with the respective rollers to guide and direct motion of the deck segments as the latter are lowered/raised, as will be described in greater detail below: The guide channels 402a-b at the base end of the first deck segment 382 have a somewhat level upper portion 414 that transitions through a bend to a roughly 45° inwardly and downwardly sloped middle portion 416, that in turn transitions through an outward bend to a more shallowly sloped (e.g., roughly 30°) inner/lower portion 418; the distally located pair of channels 404a include a somewhat vertically aligned upper portion 420 that transitions through a U-shaped bend to a generally horizontal lower/inner portion 422. The base-end guide channels 406a-b of the second, shorter deck segment 384 in turn have generally horizontally sloped upper/outer portions 424 that transition through downward bends to outwardly sloped (e.g., roughly 45°) middle portions 426, that in turn transition through outward bends to more shallowly sloped lower inner portions 428; the distal set of channels 408a-b include generally vertical upper portions 430 that transition through inward bends to generally horizontal middle portions 432, that in turn transition to relatively gently downwardly sloped (roughly 30°) lower portions 434 that terminate at slightly upturned, somewhat horizontal end portions 436.

The guide channels are suitably formed of a metallic or non-metallic material having sufficient strength and rigidity to contain and guide the guide members while supporting the weight of the deck segments, such as aluminum, steel or molded composite material, for example. In addition to the rollers that are illustrated, other guide members that may be used with the guide channels include, for example, guide pins and guide blocks, preferably formed of a low-friction material such as Delrin™. Moreover, in some embodiments the guide members may be formed with channels or grooves in which guide tracks are received, that cooperate to support and guide the deck segments in a manner similar to the guide rollers and channel-type guide tracks that are illustrated. It will also be understood that the number and path configurations of the track members may vary somewhat from those shown, depending on spacing, available height/width, and other design factors.

Figure 43:
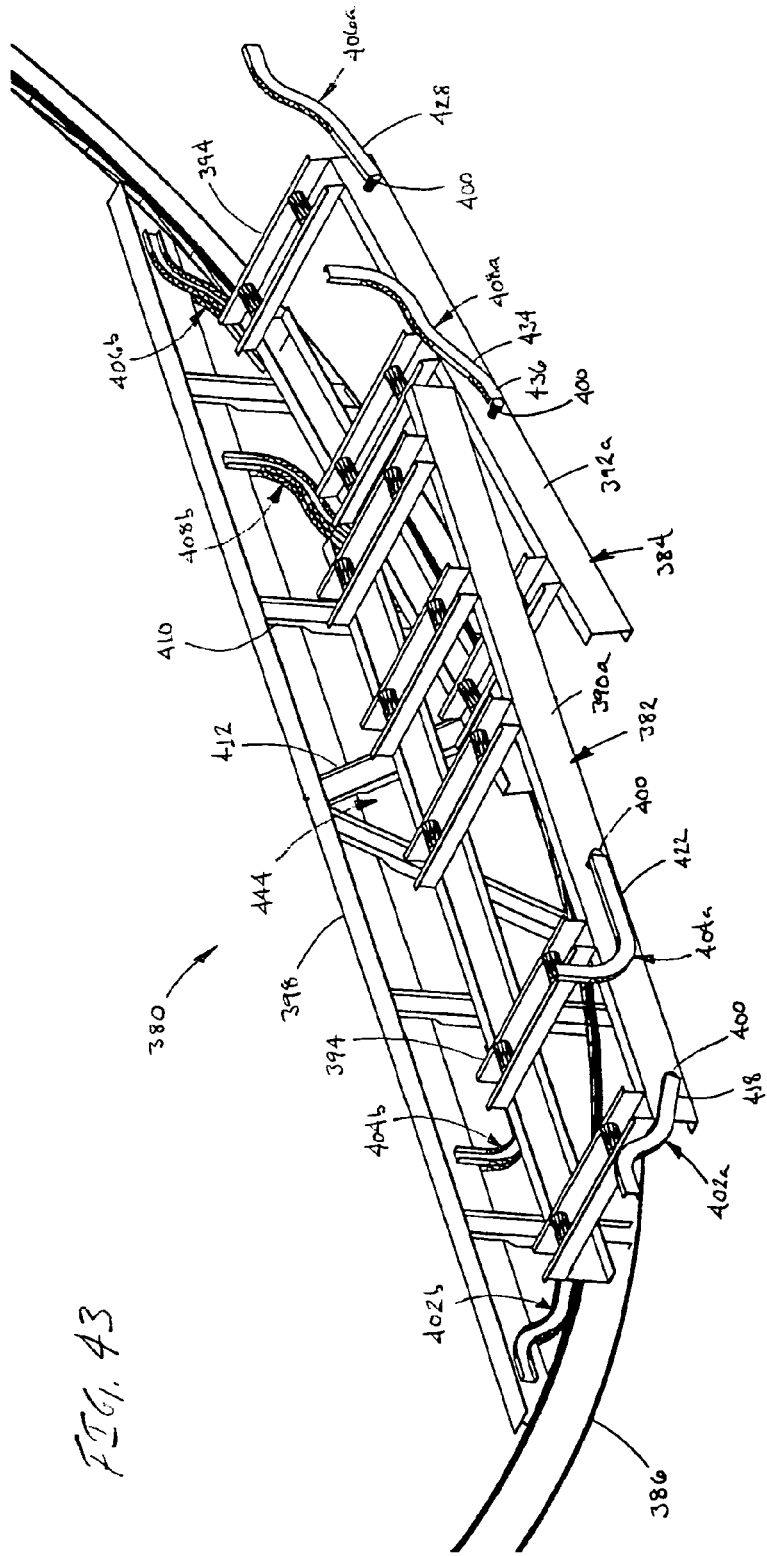
FIG. 43 is a front perspective view of the drop down floor assembly of FIGS. 39-42, showing the assembly in the lowered position.
Figure 44:
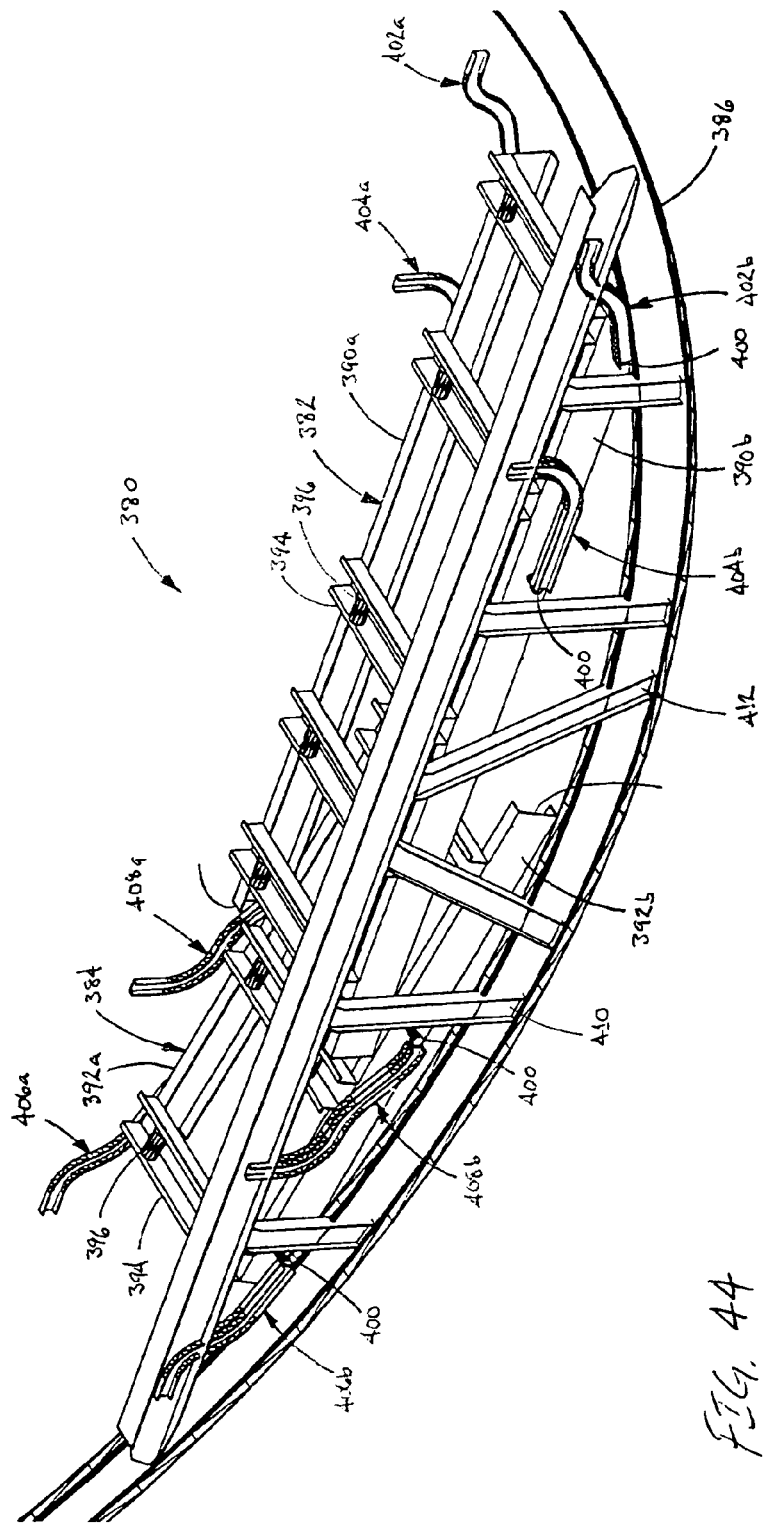
FIG. 44 is a rear elevational view of the drop down floor assembly of FIGS. 39-43, again showing the assembly in the lowered position.

The manner in which the guide roller and channels cooperate to direct movement of the deck segments is illustrated by a comparison of the assembly in the raised configuration shown in FIGS. 39 and 41-42, with the lowered configuration shown in FIGS. 40 and 43-44. As can be seen therein, to transition from the raised to the lowered configuration, the ends 440, 442 of the deck segments 382, 384 separate at junction 388, and the shorter segment 384 is first lowered toward the bottom of the fuselage area lying below the level of deck beams 398. In so doing, the distal set of guide rollers drop vertically through the upper portions 430 of channels 408a-b, while the set of rollers at the base end of the deck segment pivot in the upper portions 424 of channels 406a-b and move somewhat forwardly therethrough to accommodate the downward motion of the distal rollers. As the base set of rollers reach the bends at the bottom of upper portions 430 and move into the sloped middle portions 432 of channels 408a-b, the distal set of rollers simultaneously move forward through the upper portions 424 of channels 406a-b and then enter sloped portions 426, so that the deck segment shifts in a downward and inward direction. As the distal set of rollers enter the more steeply sloped lower portions 434 of channels 408a-b, the base set of rollers pivot in the lower portions 428 of channels 406a-b, allowing the end 442 of the deck segment to descend towards the bottom of the fuselage, and as the rollers reach end points 436 the depressed elevation of the latter relative to the corresponding end points of channels 406a-b angles the bottom of the deck segment to roughly follow and fit closely within the curved fuselage shell 386.

After the shorter deck segment 384 has been lowered into, or close to, the position shown in FIGS. 40 and 43-44, the longer deck segment 382 is lowered in its turn. As can be seen by comparison of FIGS. 41 and 43, the distal set of rollers 400 on deck segment 382 first drop vertically through the upper portions 420 of channels 404a-b, while the base set of rollers pivot and move forward within the horizontal upper portions 414 of channels 402a-b. Then, as the distal rollers pass through the U-shaped bend and the base rollers pass through downwardly sloped portions 416 of channels 402a-b, the deck segment angles downwardly somewhat and shifts in a downward and inward direction into the lower part of the fuselage. The distal set of rollers 400 then enter the horizontal lower portions 422 of channels 404a-b so as to continue movement in the inward direction, while the base set of rollers descend through the sloped lower portions 418 of the rearward channels 402a-b to bring the deck segment into the generally horizontal orientation that is shown in FIG. 40, with its inboard end 440 being positioned closely atop the second deck segment 384 in a stacked relationship and its opposite end being positioned closely adjacent the curved fuselage 386. The lowered deck segments thus fit compactly within the limited volume available in the bottom of the fuselage below the recess. The deck segments can be returned to the raised configuration by reversed procedure.

Thus lowered, the assembly 380 clears a depression 444 in the lower cargo deck of the aircraft that accommodates a lift platform, so that the latter can be lowered into a position level with the cargo deck in a manner similar to that described above. Then, when the assembly is in the raised configuration, the rail segments 394 extend level and continuous with the installed rails of the cargo deck so that pallets/cargo can be moved thereover in a normal manner. The deck segments of the translating deck assembly may be lowered and raised manually, or power may be supplied by an electric or hydraulic motor or other source. The segments may be locked in the raised configuration, for example by passing locking pins (not shown) through members 398a-b and 392a-b into the adjoining fixed deck beams 398, or by other suitable locking devices.

The translating floor assemblies thus allow the lift assembly to be used with no reduction in allowable floor space in the aircraft. The embodiments that have been described with reference to FIGS. 34-44 possess several significant advantages, particularly in terms of providing a compact, modularized system that is economical to produce and install and that is relatively light in weight, however, it will be understood that other types of temporary/moveable floor structures and mechanisms may be employed in conjunction with the lift platform of the present invention.

It is therefore to be recognized that these and various other alterations, modifications, and/or additions may be introduced into the constructions and arrangements of parts described above without departing from the spirit or ambit of the present invention as defined by the appended claims.

What is claimed is:

1. An apparatus for transferring cargo between an upper deck and a lower deck of an aircraft having at least one partition that divides an interior volume of said aircraft, said apparatus comprising:
   a lift platform that is receivable in a through opening formed in said upper deck of said aircraft, said lift platform having an upper surface for supporting a load of cargo thereon; and
   a lift mechanism that lowers and raising raises said lift platform between said upper deck and said lower deck so as to transfer loads of cargo to and from said upper deck via said through opening, said lift mechanism comprising:
   at least one lift cable; and
      a drive assembly that selectively extends and retracts said lift cable so as to lower and raise said lift platform;
   substantially the entirety of said drive assembly being housed in a structure that is incorporated into said partition so as to minimize intrusion of said drive assembly into said interior volume of said aircraft.

2. The apparatus of claim 1, wherein said drive assembly comprises:
   a linear actuator operatively connected to said at least one lift cable so as to be selectively extensible and retractable from and into said lift mechanism.

3. The apparatus of claim 2, wherein said drive assembly further comprises:
   an anchor point that retains an end of said at least one lift cable; and
   a pulley mounted to said linear actuator a spaced distance from said anchor point;
   said at least one cable being routed over said pulley from said anchor point so that in response to operation of said linear actuator in a first direction that shortens said distance between said pulley and said anchor point said lift cable is extended from said lift mechanism, and in response to operation of the linear actuator in a second direction that increases said distance between said pulley and said anchor point said lift cable is retracted into said lift mechanism.

4. The apparatus of claim 3, wherein said linear actuator comprises:
   at least one ball screw and having a travelling nut in cooperating drive engagement, said pulley being mounted to said travelling nut; and
   a motor that reversibly rotates said ball screw, in a first direction that shortens said distance between said pulley and said anchor point so as to extend said lift cable, and in a second direction that increases said distance between said pulley and said anchor point so as to retract said lift cable.

5. The apparatus of claim 2, wherein said drive assembly is mounted so that said linear actuator extends generally parallel to a main plane of said divider that is formed by said structure within said aircraft.

6. The apparatus of claim 1, wherein said structure within which said drive assembly is housed comprises said lift platform that is receivable in said opening in said upper deck of said aircraft.

7. The apparatus of claim 1, wherein said structure in which the drive assembly is housed comprises a generally horizontal deck of said aircraft.

8. The apparatus of claim 1, further comprising:
   a stabilizer assembly that stabilizes said lift platform as said lift platform is lowered and raised between said upper and lower decks of said aircraft.

9. The apparatus of claim 8, wherein said a stabilizer assembly that stabilizes said lift platform comprises:
   first and second elongate leg members that are selectively pivotable from a first, horizontal position in which said leg members nest along said lift platform when said lift platform is in a raised and stowed position to a second, vertical position in which said leg members stabilize said lift platform as said lift platform is lowered and raised between said upper and lower decks;
   first and second guide members that are mounted to said lift platform in longitudinal sliding engagement with said stabilizer legs.

10. An apparatus for transferring cargo between an upper deck and a lower deck of an aircraft, said apparatus comprising:
    a lift platform that is receivable in a through opening formed in said upper deck of said aircraft, said lift platform having an upper surface for supporting a load of cargo thereon; and
    a lift mechanism that lowers and raises said lift platform between said upper deck and said lower deck so as to transfer loads of cargo to and from said upper deck via said through opening, said lift mechanism comprising:
    at least one lift cable; and a drive assembly that selectively extends and retracts said lift cable, said drive assembly comprising:

an anchor point that retains an end of said at least one lift cable;

at least one ball screw and having a travelling nut in cooperating drive engagement, said travelling nut being located a spaced distance from said anchor point;

at least one pulley mounted to said travelling nut, said lift cable being routed over said pulley from said anchor point; and a motor that reversibly rotates said ball screw, in a first direction that shortens said distance between said pulley and said anchor point so as to extend said lift cable, and in a second direction that increases said distance between said pulley and said anchor point so as to retract said lift cable.

11. The apparatus of claim 10, wherein said drive assembly is housed substantially entirely in a structure that forms a divider in said aircraft.

12. The apparatus of claim 11, wherein said structure in which said drive assembly is housed comprises said lift platform that is receivable in said through opening in said upper deck of said aircraft.

13. The apparatus of claim 11, wherein said structure in which said drive assembly is housed comprises a generally horizontal deck of said aircraft.

14. The apparatus of claim 11, wherein said structure in which said drive assembly is housed comprises a generally vertical bulkhead of said aircraft.

15. An apparatus for transferring cargo between an upper deck and a lower deck of an aircraft, said apparatus comprising:

a lift platform having an upper surface for supporting a load of cargo thereon;

a drive mechanism that lowers and raises said lift platform between said upper deck and said lower deck so as to transfer loads of cargo to and from said upper deck;

a recess in said lower deck of said aircraft that receives said lift platform therein, so that said upper surface of said lift platform extends substantially flush with an upper surface of said lower deck when said lift platform is lowered therein; and a translating floor assembly mounted in said lower deck of said aircraft, said translating floor assembly having a raised position which defines a floor surface that extends over said recess generally flush with said upper surface of said lower deck, and a lowered position which clears said recess to receive said lift platform in said lower deck of said aircraft, said translating floor assembly comprising:

at least one collapsible deck section, said collapsible deck section comprising:

at least one generally transversely extending deck segments; and a translation assembly that displaces said deck segments between a raised configuration in which an upper surface thereof is substantially flush with an upper surface of said lower deck of said aircraft, and a lowered configuration in which said upper surfaces of said deck segment is depressed below said upper surfaces of said lower deck so as to clear said recess to receive said lift platform therein.

16. The apparatus of claim 15, wherein said translation assembly that displaces said at least one deck segment comprises:

at least one guide member mounted to said deck segment; and at least one track member with which said guide member is in cooperating engagement, so that in response to travel of said guide member along said track member said deck segment is guided between said raised and lowered configurations.

17. The apparatus of claim 16, wherein said at least one guide member comprises:

guide rollers mounted to sides of said at least one deck segment.

18. The apparatus of claim 17, wherein said at least one track member comprises:

guide channels in which said guide rollers are received for travel therethrough.

19. The apparatus of claim 15, wherein said at least one collapsible deck section, comprises:

first and second generally transversely extending deck segments; and means for displacing said first and second deck segments between a raised configuration in which said deck segments extend in end-to-end alignment with upper surfaces thereof substantially flush with said upper surface of said lower deck of said aircraft, and a lowered configuration in which said upper surfaces of said deck segments are depressed below said upper surface of said lower deck so as to clear said recess for receiving said lift platform therein.

20. The apparatus of claim 19, wherein said translation assembly that displaces said first and second deck segments comprises:

at least one guide member mounted to each of said first and second deck segments; and at least first and second track members with which each guide members are in cooperating engagement, so that in response to travel of said guide members along said track members said deck segments are guided between said raised and lowered configurations, said track members extending generally inwardly and downwardly from relatively elevated outboard ends to relatively depressed inboard ends, so as to guide said first and second deck segments inwardly and downwardly towards said depressed configuration and upwardly and outwardly towards said raised configuration.

21. The apparatus of claim 15, wherein said collapsible deck section further comprises:

a plurality of rail segments mounted on said at least one deck segments that align with cargo rails on said lower deck of said aircraft when said deck segment is in said raised configuration.

22. The apparatus of claim 18, wherein said recess in said lower deck of said aircraft comprises:

an area of said lower deck of said aircraft in which edges of floor frames have been removed so as to form said recess therein.

23. The apparatus of claim 22, wherein said translating floor assembly is mounted in an intercostal space intermediate said floor frames of said lower deck of said aircraft.

24. The apparatus of claim 23, wherein said guide channels comprise:

guide channels mounted in pairs to said floor frames on opposite sides of said first and second deck segments in said intercostal space between said floor frames.

25. The apparatus of claim 24, wherein said translating floor assembly comprises:
a plurality of said collapsible deck sections mounted in a plurality of said intercostal spaces over a length of said recess in said lower deck of said aircraft.

\* \* \* \* \*